(12) United States Patent
Whalen et al.

(10) Patent No.: US 7,614,015 B2
(45) Date of Patent: Nov. 3, 2009

(54) METHOD AND SYSTEM FOR REPRESENTING GROUP POLICY OBJECT TOPOLOGY AND RELATIONSHIPS

(75) Inventors: William J. Whalen, Seattle, WA (US); Carey Tanner, Gold Bar, WA (US); Matthew Wetmore, Redmond, WA (US); William P. McDaniel, Clearwater, FL (US)

(73) Assignee: Microsoft Corporation, Redmond, WA (US)

( * ) Notice: Subject to any disclaimer, the term of this patent is extended or adjusted under 35 U.S.C. 154(b) by 707 days.

(21) Appl. No.: 10/410,883

(22) Filed: Apr. 9, 2003

(65) Prior Publication Data

US 2004/0215649 A1  Oct. 28, 2004

(51) Int. Cl.
*G06F 3/048* (2006.01)
*G06F 17/00* (2006.01)
*G06F 3/00* (2006.01)
*H04L 29/00* (2006.01)

(52) U.S. Cl. .................. 715/853; 707/102; 726/11; 715/854

(58) Field of Classification Search ............ 715/853
See application file for complete search history.

(56) References Cited

U.S. PATENT DOCUMENTS 6,088,451 A * 7/2000 He et al. .................. 726/8
6,253,234 B1 * 6/2001 Hunt et al. ................ 709/213
6,412,070 B1 * 6/2002 Van Dyke et al. .......... 726/17
6,484,261 B1 * 11/2002 Wiegel ..................... 715/763
6,633,312 B1 * 10/2003 Rochford et al. .......... 715/736
2002/0087670 A1 * 7/2002 Epstein et al. ............. 709/223
2003/0041142 A1 * 2/2003 Zhang et al. .............. 709/224
2004/0075680 A1 * 4/2004 Grace et al. ............... 345/734

OTHER PUBLICATIONS

Lundy, Jim, Administering Group Policy with Group Policy Management Console, Dec. 11, 2002, Microsoft Corp., all pages.*
Microsoft Corporation, "Microsoft Windows 2000 Server Resource Kit", Feb. 19, 2000, Microsft Press, 1st Edition, pp. 1-13 as attached.*

* cited by examiner

*Primary Examiner*—William L Bashore
*Assistant Examiner*—Jordany Núñez

(57) ABSTRACT

A user interface is disclosed for representing group policy object topology and relationships, while allowing interaction to facilitate group policy management. Forests, sites and domains are hierarchically displayed in a treeview that reflects the network topology. The treeview also represents group policy objects, links, filters and other nodes. Administrators perform operations across forests, domains and sites, and perform operations on other nodes in the treeview. Administrators control which forests, sites and domains are viewable in the treeview, and the treeview state is persisted. Logic automatically reduces the topology's complexity by limiting the presentation of forests and/or domains to only those with which the administrator's forest and domain have a proper trust relationship. Also provided is a tabbed view in a result pane area that provides a rich display of complex data, and intelligent refresh logic to update changes in one user interface area to other user interface areas.

21 Claims, 21 Drawing Sheets

METHOD AND SYSTEM FOR REPRESENTING GROUP POLICY OBJECT TOPOLOGY AND RELATIONSHIPS

CROSS-REFERENCE TO RELATED APPLICATIONS

The present invention is related to the following copending United States Patent Applications, entitled "Support Mechanisms for Improved Group Policy Management User Interface" (Ser. No. 10/410,887), "Method and System for Implementing Group Policy Operations" (Ser. No. 10/410,865), and "Interfaces and Methods for Group Policy Management" (Ser. No. 10/411,876), filed concurrently herewith. Each related application is assigned to the assignee of the present patent application and hereby incorporated by reference in its entirety.

FIELD OF THE INVENTION

The invention relates generally to computer systems and networks, and more particularly to policies used in computer networks.

BACKGROUND OF THE INVENTION

In contemporary computing networks, network administrators define policies for users and computer systems of that network. With a Microsoft Windows®-based operating system, administrators use Group Policy technology to define the state of users' work environment, and rely on the system to enforce the defined policies. In general, those policies are then applied to determine how the various computer systems are configured. For example, the configuration that a user sees when logged onto any computer system of the network depends on the policy settings for that machine combination with the policy settings for that user.

In such a network, Group Policy can be used to specify many of the settings for a user and computer, including registry-based policy settings used to configure and specify behavior of the operating system and optionally application programs based on settings in various computer systems' registries, and script-related policy settings control scripts for computer startup and shutdown, and user logon and logoff. Group policy can also specify particular software programs for groups of users and/or machines, as Group Policy includes settings for centrally managing the installation, updates, and removal of application programs and components. Security options are also provided by policy settings, e.g., for local computer, domain, and network security settings. Folder redirection options, which allow administrators to redirect users' special folders to the network, also may be managed via Group Policy, as can Internet Explorer Maintenance, which is used to manage settings related to Internet Explorer and Remote Installation Services options, which are used to manage client configuration options that users see when performing Remote Installation Services-based installs. Internet Protocol Security Settings and Wireless settings can also be deployed through Group Policy, and public key policy settings, as well as software restriction policies can also be managed.

To apply and enforce the policy in a Windows®-based operating system, the Group Policy settings that administrators create are contained in group policy objects (GPOs), which in turn are applied to one or more scopes of management, such as a site, domain, or organizational unit (OU) in Active Directory®. A site, domain, or organizational unit may also be referred to as a scope of management, or SOM. In this manner, administrators centrally apply policy to users and computers of those sites, domains, and organizational units. Policy settings from each of these different hierarchical levels are combined and applied to the policy recipients. Any conflicting policy among the levels is resolved via various rules, as generally described in U.S. Pat. No. 6,466,932, herein incorporated by reference.

While group policy is a very powerful technology, and group policy objects greatly simplify network administration, group policy objects are not simple objects, but rather virtual objects comprising complex pieces of setting definitions that are stored on the domain. In general, each group policy object comprises multiple subcomponents, typically including a collection of many files, other objects and attributes, that reference one another in various ways.

Furthermore, managing Group Policy in an enterprise environment requires an understanding multiple sets of data, simultaneously. For example to understand which computers and users will receive and apply the settings in a group policy object, the administrator has to access and understand multiple sets of information, including the scopes of management to which the group policy object is linked, the security filtering on a group policy object, and the WMI filter, if any. Heretofore, this data was not available to an administrator in one consolidated view.

Another problem is that a group policy object can be associated with multiple scopes of management, and thus when editing the contents of a group policy object, the administrator needs to fully understand that a group policy object may be linked to more than one scope of management, which is not readily apparent on prior tools, nor is it apparent that a link to a group policy object is not the group policy object itself. Inheritance adds further complexity, because multiple group policy objects can be applied to a given scope of management, and group policy objects can be also inherited from parent scopes of management, whereby it may be very difficult for an administrator to understand which group policy objects apply at a given scope of management. Furthermore, although group policy object are inherited by default, it is possible to block this, as well as selectively enforce some links. Although this provides significant flexibility to the administrator, complexity is also increased.

As a result, managing group policy requires a sophisticated understanding of various sets of data. At the same time, the prior toolset for managing group policy is complex yet fairly limited, making it difficult for administrators to understand the group policy environment and thus make effective use of group policy. In sum, what is a needed is a user interface managing group policy that makes the interrelationships between the various sets of group policy related data clear, and enables the administrator to more easily and efficiently focus on the management task at hand.

SUMMARY OF THE INVENTION

Briefly, the present invention provides a system and method for representing group policy object topology and relationships in a manner that is comprehensive with respect to displaying group policy-related items, while allowing interaction with those items in an intuitive manner, thereby facilitating group policy management. Group policy items that are displayed in one common location include forests, sites domains, an organizational units in a hierarchical treeview area that reflects the topology of the network. Also represented in the treeview hierarchy are group policy objects, links on SOMs to those group policy objects, WMI filters and other nodes. The display of the node topology in one location makes it possible for administrators to easily manage group policy across an enterprise. For example, administrators may perform operations across forests, domains and sites, and select individual forests, domains, sites, group policy objects, filters, links to group policy objects and so forth for performing operations on those individual items.

Further, administrators may selectively control which forests, sites and domains are viewable in the group policy management console display, by adding and removing items as desired. The group policy management console automatically saves data that preserves the last view, so as to return to that view when the group policy management console is re-opened.

The group policy management console includes logic that automatically reduces the complexity of the topology by limiting (by default) the presentation of forests and/or domains to only those with which the administrator's user forest and user domain has a proper trust relationship. In other words, the system defaults to hiding from view any forests and/or domains that the administrator does not have access, thereby removing much of the complexity of network management for that administrator. To this end, a function is provided to determine a target forest for a given target domain. From there, another function determines the trust relationships between the target forest/target domain and user forest/user domain. Another function obtains a list of those domains in the target forest that have a proper trust relationship with the user's domain. The group policy management console allows the administrator to override such trust detection and view (but not necessarily access) a forest and its domains where there is otherwise not a proper trust relationship.

Also provided is an improved mechanism for intuitive interaction with the various tree nodes' data when a tree node is selected and displayed, such as in a result pane area. To this end, a tabbed view provides a rich display of complex data in the result pane display area, which may be accessible via multiple tabs. Each tab generally corresponds to a task to be performed with respect to the selected node's data. Within a tabbed page there may be separate sections, allowing otherwise scattered data to be presented on a single page. Intelligent data reselect logic is also provided to smooth transitions as the administrator selects different objects and tasks.

The sections within a single tab may be resizable, (with one or more other sections fixed), which allows the administrator to customize the presentation of the information, depending on the relative importance and quantity of the data in a given section to that administrator. The section ratios are preserved relative to the overall window size, with the sections (comprising controls) maintaining their relative ratios to one another. However the controls know their actual size (e.g., in pixels), and can thus rearrange their display in a manner that adjusts for the actual area that each control has for displaying its content.

Other advantages will become apparent from the following detailed description when taken in conjunction with the drawings, in which:

DETAILED DESCRIPTION

Exemplary Operating Environment

Figure 1:
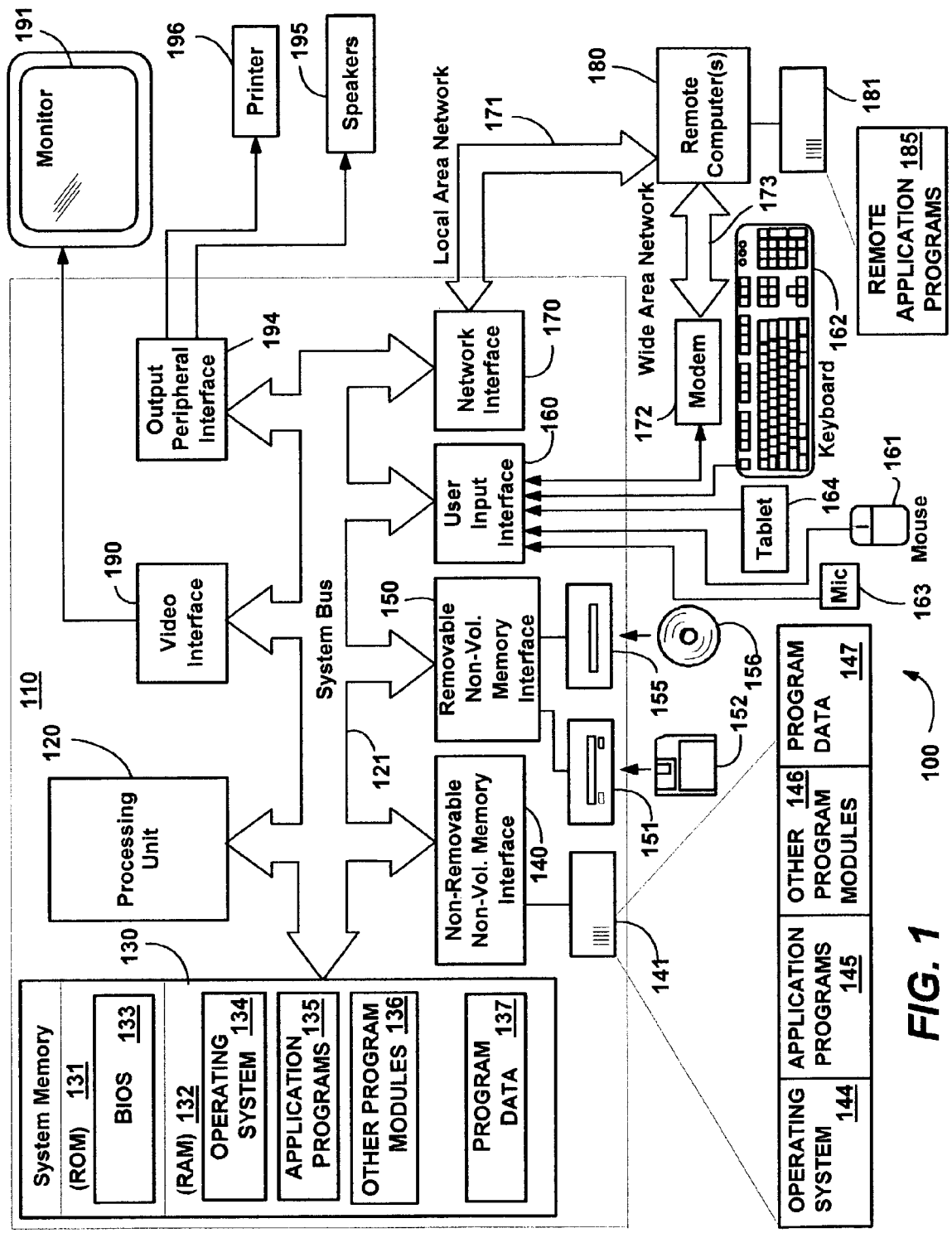
FIG. 1 is a block diagram generally representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. For example, in the present invention, the computer system 110 may comprise source machine from which data is being migrated, and the remote computer 180 may comprise the destination machine. Note however that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Group Policy Objects

In general, the present invention provides a method and system for operating on policies implemented throughout a network, wherein those policies are defined and arranged (e.g., by one or more administrators) into group policy objects. Group policy objects generally comprise a collection of files, objects and attributes that exist at various locations in the network. Such policy may correspond to policy settings in the group policy objects, including registry-based settings, scripts, (computer startup and shutdown scripts, and user logon and logoff scripts), redirection of folders that contain user documents and settings, application deployment (software installation), security settings, public key policy settings, software restriction policies, IP security, remote installation services, and/or Internet Explorer Maintenance. Indeed, group policy objects may be extended to include virtually any desired information, as long as a client-side (or other) extension that uses the policy object is capable of interpreting and/or handling the information therein.

In an example implementation described herein, the system and method of operating on group policy utilize a highly flexible architecture of the Microsoft Windows® operating system, in which an administrator links the group policy objects to the containers, which comprise hierarchically organized directory objects representing sites, domains and organizational units, with policy recipients (e.g., users and computers) being associated with those containers. In this implementation, generally represented in FIG. 2, the group policy objects preferably utilize a Windows® directory service (e.g., in components 201 and 202), known as Active Directory®, which stores information about the objects of a domain, and makes this information easy for administrators to access, find and apply via a single, consistent and open set of interfaces. Note that each domain controller has a directory service component, with data replicated to other directory service components, but for purposes of the examples the directory service will be described with reference to the directory service component 202. Thus, for example, with the Active Directory® service 202, administrators can access resources anywhere on the network. Similarly, administrators have a single point of administration for the objects on the network, which can be viewed in a hierarchical structure. Each domain controller also has a sysvol component that is similarly replicated, typically for maintaining larger sets of data (relative to the size of the sets of data in the directory service). Note that for purposes of explanation herein, the user performing such group policy object-related tasks will be referred to as an administrator, although it is understood that any user with appropriate security privileges can perform these tasks, even if not actually designated as an administrator.

Figure 2:
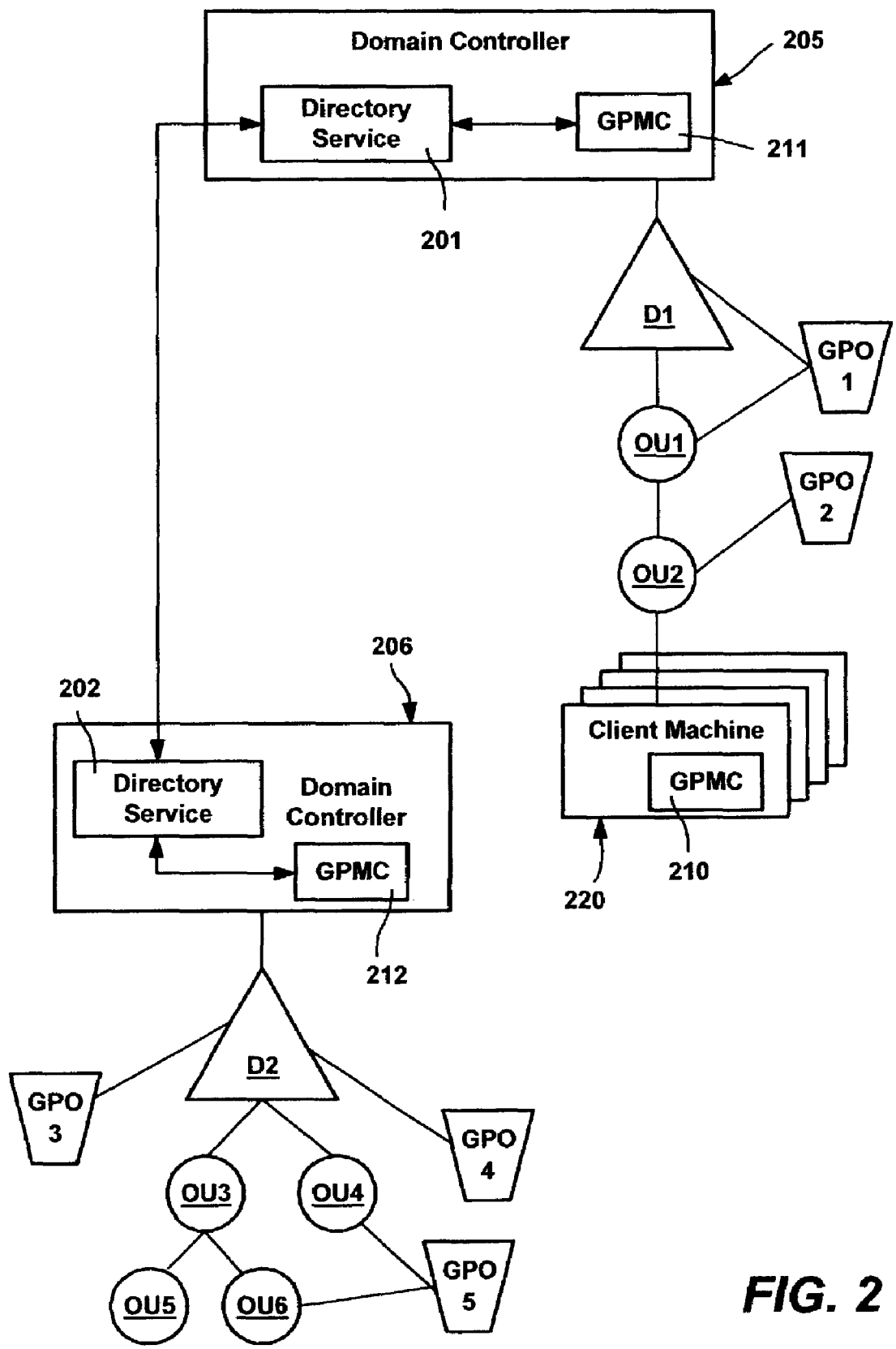
FIG. 2 is a block diagram generally representing a network including a directory service and domain controllers with group policy objects capable of being operated on in accordance with an aspect of the present invention.
Figure 3:
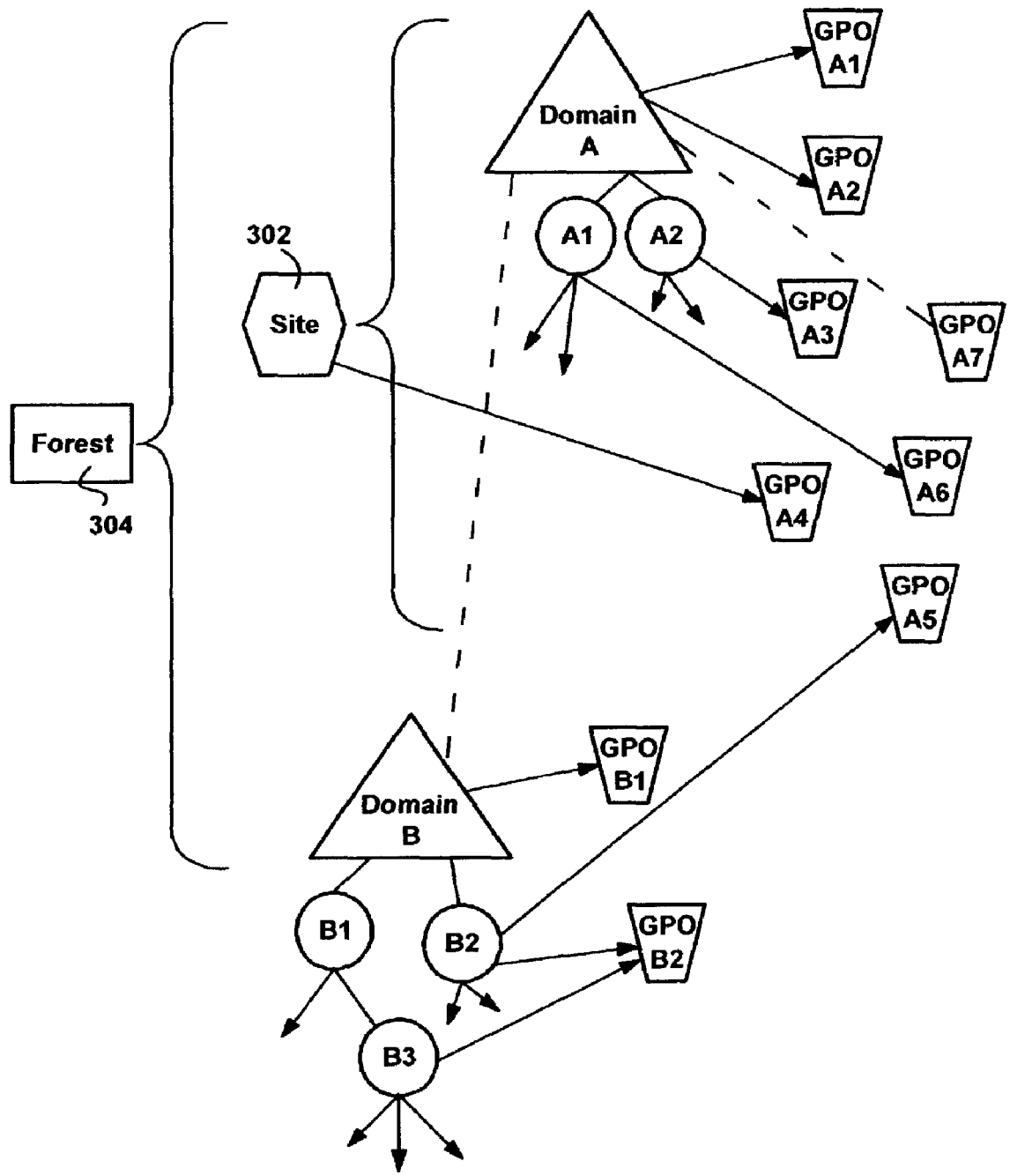
FIG. 3 is a representation of a forest, site, domains and organizational units in network with associated group policy objects capable of being operated on in accordance with an aspect of the present invention.

A core unit in the Active Directory® service is a domain, shown via domains D1 and D2 in FIG. 2, which are each controlled by one or more domain controllers, shown as the domain controller 205 and the domain controller 206, respectively. Note that there may be more than one domain controller per domain. Many of the objects of a network exist within a domain. As generally represented in FIG. 3, a single domain can span multiple physical locations or sites (e.g., 302), and domains can be grouped together into a forest 304, typically in some logical grouping as determined by an administrator. A site 302 comprises one or more ranges of IP addresses of which computers can be a member, often a grouping of computers related by some geographical area.

Organizational units (e.g., OU1-OU6 in FIG. 2) are a type of directory object included within domains that are hierarchically organized logical containers into which users, groups, computers, and even other organizational units may be logically placed. Group policy objects e.g., GP1-GP5 in FIG. 2) are stored in (exist in) a domain, and can be applied to one or more sites, domains, and/or organizational units. Note that a site, domain, and/or organizational unit may be referred to as a scope of management, or SOM. It will be readily appreciated that although described herein with reference to Microsoft Windows®, the Active Directory® service, sites, domains, organizational units, and so forth, the present invention is not limited thereto, nor even to directory containers in general, but rather is applicable to any types of policy objects and/or scoping mechanisms that require management in a network.

To apply policy to policy recipients (users and machines) of the network, group policy objects may be created via a group policy management console (e.g., 210, 211 or 212 in FIG. 2), or similar program with a suitable user and/or programmatic interface. Note that as represented in FIG. 2, an instance of the group policy management console may be run from essentially any machine in the network that is capable of running a management program, including client machines (e.g., 220) or the domain controllers 205 and 206. Once created, group policy objects may then be linked to an appropriate container or containers (e.g., objects representing a scope of management, such as sites, domains and organizational units) that are arranged in a hierarchy with which the policy recipients are associated. For example, any group policy management console 210, 211, 212 or similar user interface tool allows administrators to selectively associate the group policy objects GPO1 and GPO2 with directory container objects D1, OU1 and OU2 in FIG. 2. Note that as represented by the dashed line from Domain A to the group policy object GPOA7 in FIG. 3, a group policy object may exist in a domain but not be linked to a container.

Each group policy object (e.g., GPO3 of FIG. 2) may be composed of group policy information maintained in many locations in the network, including objects and attributes stored in the Active Directory® service 202, and collections of system volume (sysvol) files, wherein the sysvol comprises a folder on a domain controller (e.g., 206), such as used to replicate file-based data among domain controllers. The policy information may include one or more pointers to another location (e.g., a data file on a remote share) where some or all of the actual policy information (or a further pointer thereto) is maintained. Policy information also may be stored in a virtual registry (e.g., a copy of some or all of a client machine's registry maintained in a file on the server, specifically in the group policy template), that may be used by an extension to put information into the client-machine's registry.

Because many group policy objects can apply to one policy recipient, such as via a domain association or one or more organizational units to which the policy recipient belongs, for each policy recipient, the policy settings maintained in the policy objects may be selectively accumulated in an order of precedence, inherited from the group policy objects associated with one or more higher-up organizational units, a site, and/or the domain, and/or blocked from being inherited. In general, to accumulate policy for a policy recipient, policies are applied in a manner such higher policies that are enforced take precedence by hierarchical order, while higher non-enforced policies may be overridden by lower-level policies.

Representing Group Policy Object Topology and Relationships

The group policy management console, in conjunction with a Microsoft® Management Console (MMC), for example, provides a mechanism for representing and managing group policy topology and relationships among various aspects of group policy-related data. Note that the group policy management console can be configured to operate in other environments, however one reason that the group policy management console was incorporated into the MMC environment is to be grouped with other MMC tools that may be appropriate to the administrator's overall tasks. The group policy management console 212 provides this group policy representation and management functionality in a number of ways, including by providing a user interface and underlying logic for managing group policy across multiple domains, sites, and forests. For example, from a single unified view, an administrator can view, manage, and search across domains, sites, and even forests, copy group policy objects and import data to group policy objects, and so forth.

Figure 4:
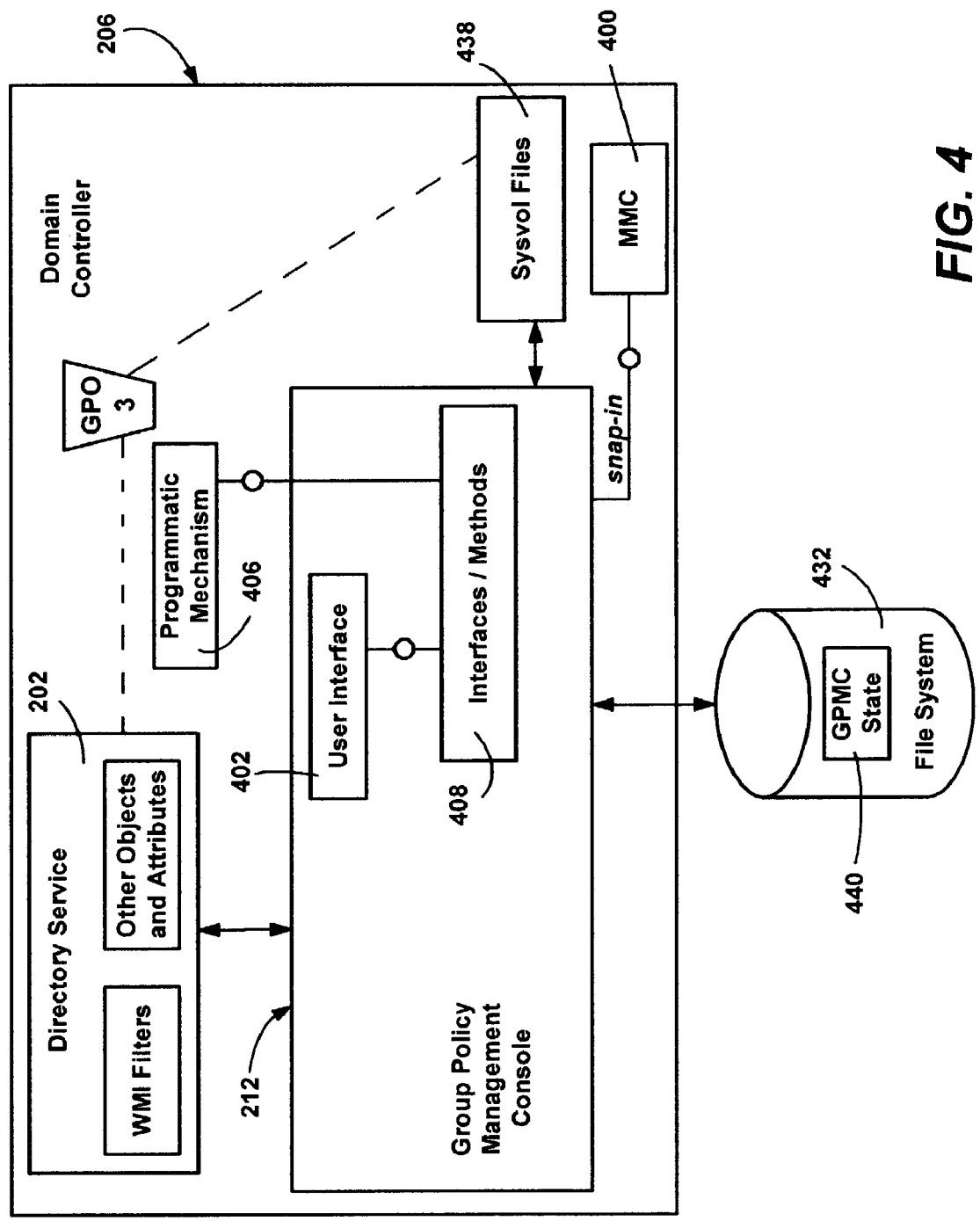
FIG. 4 is a block diagram generally representing components of the group policy management console and related components in accordance with an aspect of the present invention.

FIG. 4 is a block diagram generally representing example components for performing various aspects of the present invention when implemented on a computer system, such as the domain controller 206 (FIG. 2). In this example implementation, the user interface 402 to the group policy management console 212 is a snap-in to the Microsoft® Management Console (MMC) 400. The MMC 400 and its use of such snap-ins is well-known, and is not described in detail herein, other than to note that the user interface 402 to the group policy management console 212 complies with the requirements of the MMC 400 for snap-ins. However, as described below, the group policy management console 212 provides a number of innovations, features, functionality and similar advantages that are not found in other known snap-ins.

As represented in FIG. 4, a user interface 402 and/or a programmatic mechanism (for example including script) 406 connect to the group policy management console 212 via interfaces and methods 408, such as described in the aforementioned patent application entitled "Interfaces and Methods for Group Policy Management." Although other user interfaces can similarly connect to the interfaces and methods 408, the user interface 402 is configured in accordance with various aspects of the present invention, and thus is a preferred user interface, which in one implementation is provided as part of the overall group policy management console technology.

As will be understood, the group policy management console 212/user interface 402 provide a number of group policy-related management services, by accessing the directory service 202 and/or sysvol files 438 that make up the group policy objects of a domain, and also by accessing a file system (independent of sysvol) for accessing group policy objects backup, migration tables, and so forth. Also, as represented in FIG. 4, the group policy management console 212 is able to access a file system 432 or the like in which various group policy management console state data 440, such as selections made via the user interface 402, can be persisted. For example, this allows administrator choices, settings and so forth to be preserved for the next time that the administrator runs the group policy management console 212.

In accordance with an aspect of the present invention, the group policy management console 212 enables the administrator to view and manage group policy across multiple domains, multiple sites, and multiple forests. Among other benefits, the present invention allows a single set of administrators to understand the policy environment with respect to multiple domains, sites and forests, and perform administrative tasks, such as importing and/or copying settings to group policy objects across various locations, e.g., across forests and domains. Importing, copying and other group policy management console operations are further described in the aforementioned copending patent application entitled "Method and System for Implementing Group Policy Operations."

Figure 5:
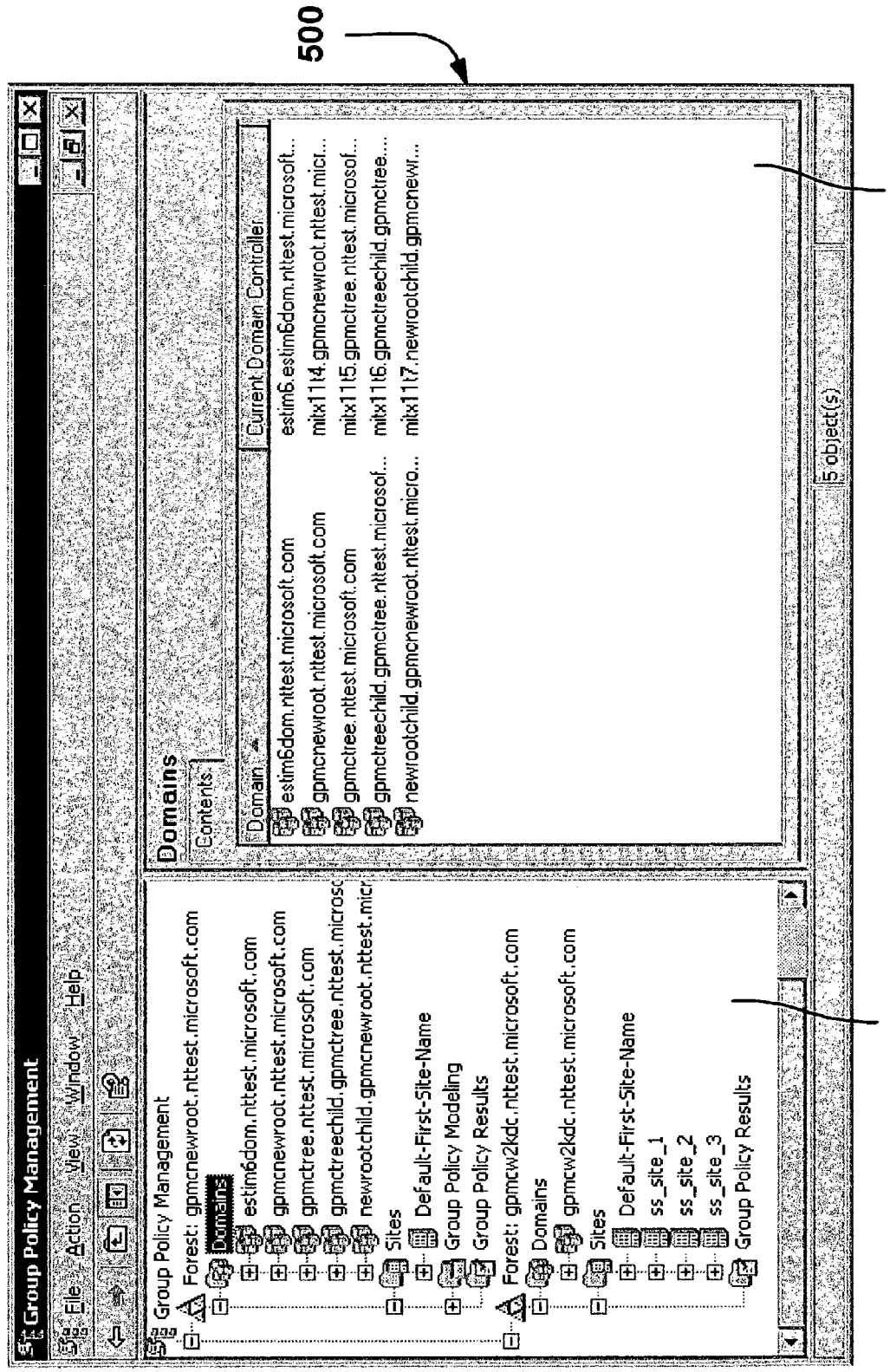
FIGS. 5 and 6 are representations of a user interface displays having the network topology hierarchically arranged in a treeview area, and selection based data in a result pane area to facilitate group policy management in accordance with an aspect of the present invention.
Figure 6:
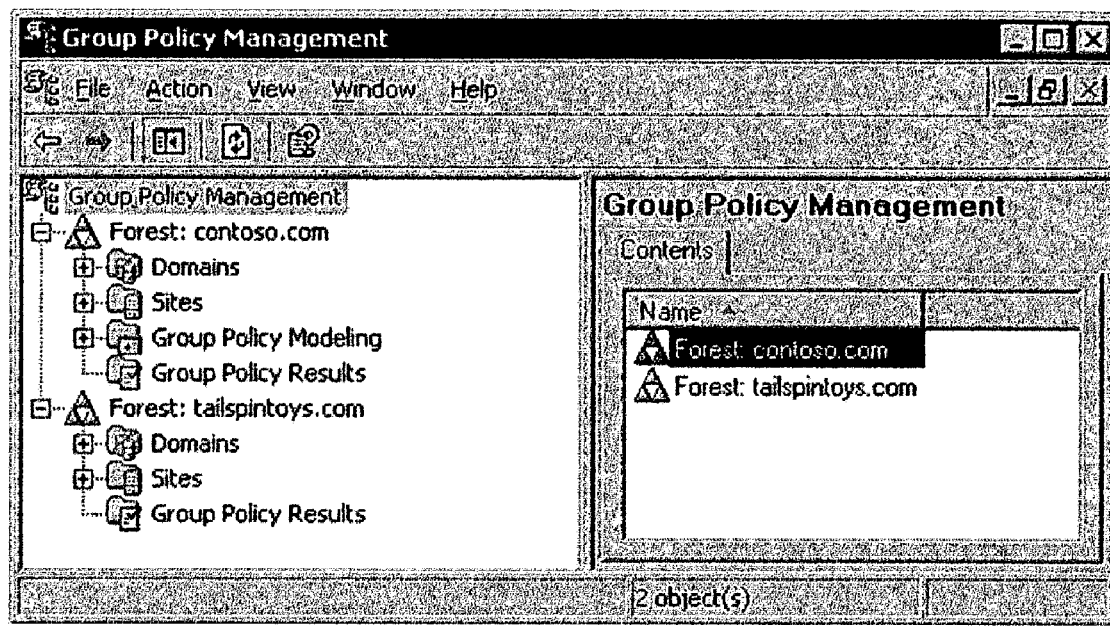

As represented in FIG. 5, the group policy management console 212 supports management of multiple forests, sites and domains, making it possible for administrators to easily manage group policy across an enterprise, e.g., by providing an interactive group policy management display 500 via the user interface 402. In this management display 500, forests, sites, domains and organizational units are displayed in a hierarchical manner which represents their topology and relationships to one another, as well as their relationships to actual group policy objects in each domain as well as links to group policy objects. In the example implementation 500, the hierarchy (tree) of nodes is displayed in the left display area 502, referred to as a treeview, whereas specific information relative to what is selected in the hierarchy (e.g., domain-related information in the example of FIG. 5) is provided in the right display area 504, referred to as a result pane 504. Note that although what is represented in the hierarchy in FIG. 5 provides data (e.g., nodes representing multiple forests, domains and sites) that are collected and arranged in a manner that was heretofore not available to administrators, the hierarchy tree is presented in a well-understood manner with respect to an administrator's experience in interacting with other types of such trees. For example, by interacting in an intuitive way with the treeview area 502, the administrator can expand and collapse parent (non-leaf) nodes as desired, and also can select nodes, such as for interaction with their data via the display area 504, or by performing commands with respect to the currently-selected node, such as by right-clicking the node or clicking on menu bar items to choose a command to perform. By way of example, FIG. 6 shows what appears in the right side display area when a top-level "Group Policy Management" node is selected, namely forest-related data. It should be noted that while the capabilities of the multi-forest, multi-domain, and multi-site hierarchical tree in the group policy management console are generally directed towards the various tasks associated with managing group policy, this hierarchical presentation of directory information has broad applicability for managing many aspects of Active Directory, beyond group policy.

In accordance with another aspect of the present invention, administrators may selectively control which forests, sites and domains are viewable in the group policy management console display tree in the area 502, (and thus what can be presented in the result pane area 504), making it possible to display only parts of an environment that are pertinent to the administrator. Further, the group policy management console 212 includes logic that helps the administrator make such selections, e.g., by limiting (by default) the presentation of forests and/or domains to only those with which the administrator's forest and domain has a proper trust relationship, as described below. In other words, for each individual administrator, the present invention defaults to hiding from view forests and domains that the administrator does not have rights to access, thereby removing much of the complexity of network management for that administrator. Note that although the present invention thus defaults to hiding forests and domains with which there is not a proper trust relationship, the enforcement is performed external to the group policy management console 212, and indeed, as described below, the administrator is allowed to override such trust detection and view other forests and domains, but is otherwise still subject to any external enforcement mechanisms. It should also be noted that such trust detection logic is based on the trust relationship between the domain of the user and the targeted domain, irrespective of the domain of the computer that the user has logged on to.

In one implementation, one way in which complexity is reduced with respect to forests and domains is accomplished by starting with only one forest and domain in the treeview area 502. From there, the administrator is allowed to selectively add other forests and domains as desired, after (by default) filtering out those which do not have a proper trust relationship with the administrator's user forest and domain.

To give the administrator a forest and domain to start with, the first time the group policy management console 212 is launched, the group policy management console 212 loads the forest and domain that contains the user object that is logged on to the computer, in other words, the administrator sees his or her own user domain and user forest. As described below, the user's domain information may be obtained by calling a published application programming interface (API), and once the domain is known the forest may be obtained, also via an API. Note that in one implementation, the group policy management console 212 can only be run with a domain account (not a local account), and thus in this implementation, the administrator always will have a user domain and user forest. This gives the administrator a starting point from which to specify other domains and forests to display for management. The administrator can remove the default forest and domain and persist that removal, even if none remain. However, in an alternative implementation, it may be required that at least one forest and domain (but not necessarily the default ones) are always presented. FIG. 5 shows the user interface 500 when two example forests have been added to the console tree area 502 as nodes, (one of which may have been added by the group policy management console by default).

As represented in FIG. 5, the console tree display area 502 (on the left side) of the group policy management console 212 contains the root node named "Group Policy Management." Each forest appears as a sub-node of the Group Policy Management root node in the treeview area 502, and is named after the forest root domain for that forest, pre-pended with the text "Forest:". Each forest may include sub-nodes, comprising a container node called "Domains" that comprises zero or more domains, a container node called "Sites" that comprises zero or more sites, a "Group Policy Modeling" sub-node and/or a "Group Policy Results" sub-node. Display of the sub-nodes may be dependent on other criteria, e.g., the Group Policy Modeling sub-node may not be available in a forest corresponding to older operating environments, such as one that precedes the Windows® Server 2003 schema.

In accordance with an aspect of the present invention, administrators can select one or more domains to manage, and the group policy management console 212 only displays the domain or domains that are selected. The selections are persisted in the GPMC state 440, in that before closing, the group policy management console 212 automatically saves data that preserves the last view so as to return to that view when re-opened, whereby administrators need not reconfigure their selections (e.g., add and remove various domains from view on the console) each time the group policy management console 212 is re-run.

As can be readily appreciated, such a per-administrator customized display removes a great deal of complexity and confusion for administrators. To this end, as described below with respect to trust checking, administrators can select and have displayed only those domains to which the administrator has (or at least appears to have) access. However, as also described below there are certain situations in which an administrator actually may have access to a domain that otherwise appears to be prevented from being accessed by that administrator. For these situations, a mechanism to bypass (disable) trust checking is provided so that administrators can view and access such domains.

In accordance with an aspect of the present invention, a number of mechanisms may be provided to add a forest and domain to the administrator's current display 500. For example, in implementations in which the forest information is known to be valid and accessible (e.g., in directory service containers) to the group policy management console 212, the information can be presented to the administrator as a list to browse, and from the list, the administrator may select one or more forests to add. From there, the trusted domains (or assumed to be trusted domains if trust checking is disabled) of that forest may be obtained, and administrator can select one or more domains to add to tree in the view 502.

Figure 7:
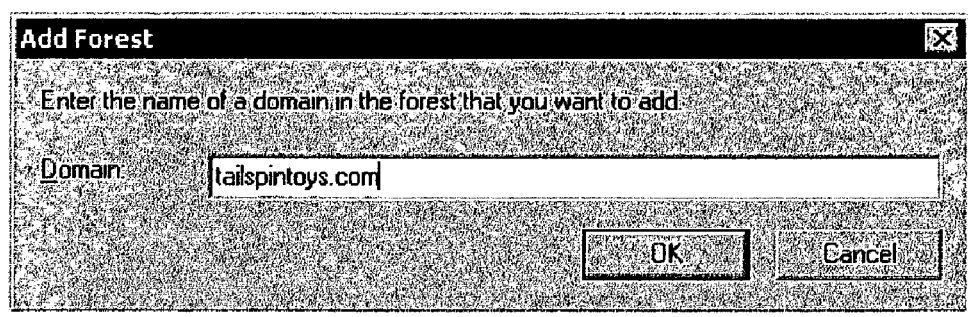
FIG. 7 is a representation of a user interface dialog for adding a forest via a domain name in accordance with an aspect of the present invention.
Figure 21:
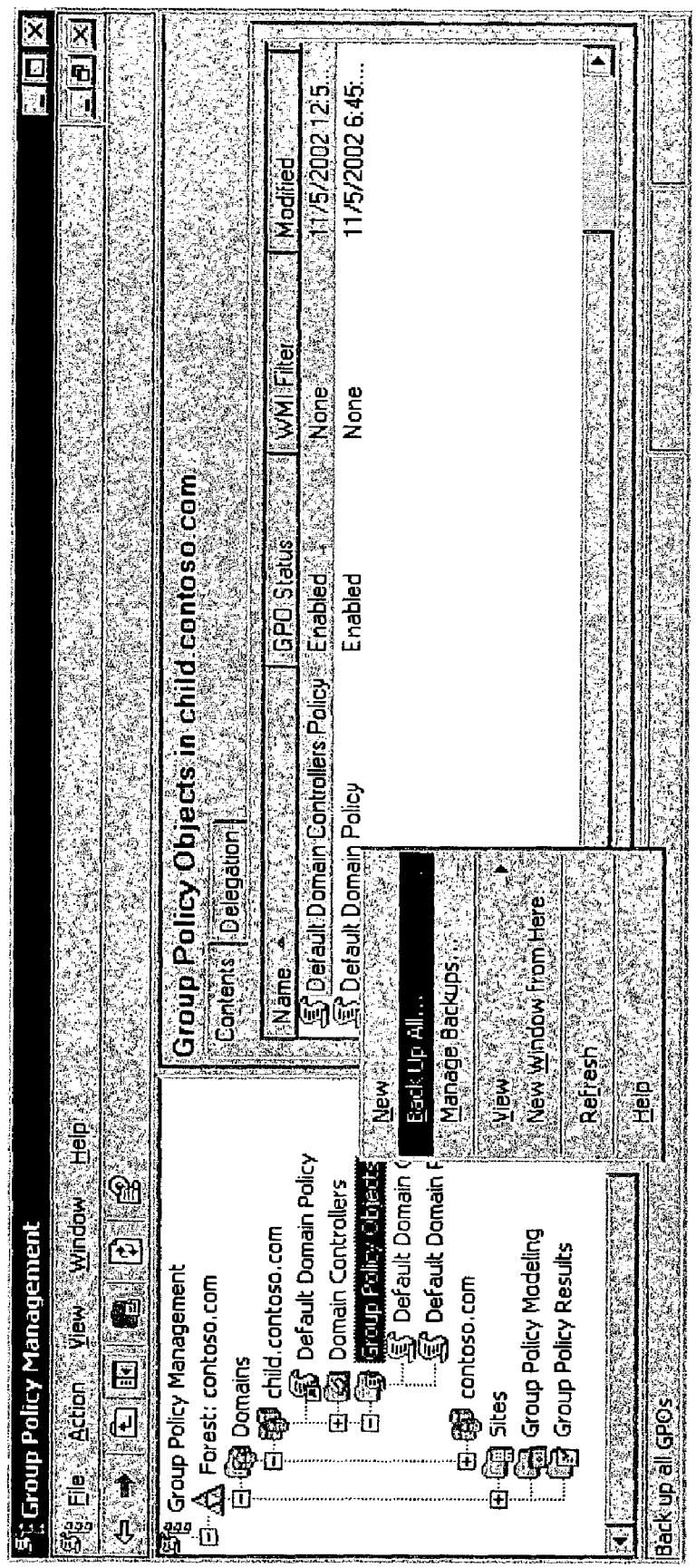

Alternatively, such as in environments in which the forests are not directly available for browsing, a forest can be determined from a domain named supplied by an administrator (e.g., typed). FIG. 7 shows such an "Add Forest" dialog, which can be invoked via administrator-selection of a corresponding "Add Forest" command or the like, e.g., chosen in a typical manner from a context menu of such commands, (FIG. 21) or by clicking an appropriate icon. The administrator is prompted for a domain name, and can type in a full DNS (domain name system) name for the domain, or a shorter, NetBIOS name.

In general, the forest name is determined by a lookup performed in a DNS (e.g., a directory service lookup). Then, based on the lookup result, relevant domains of that forest, with which there is a trust relationship with the users' domain, may be presented to the user.

Figure 8:
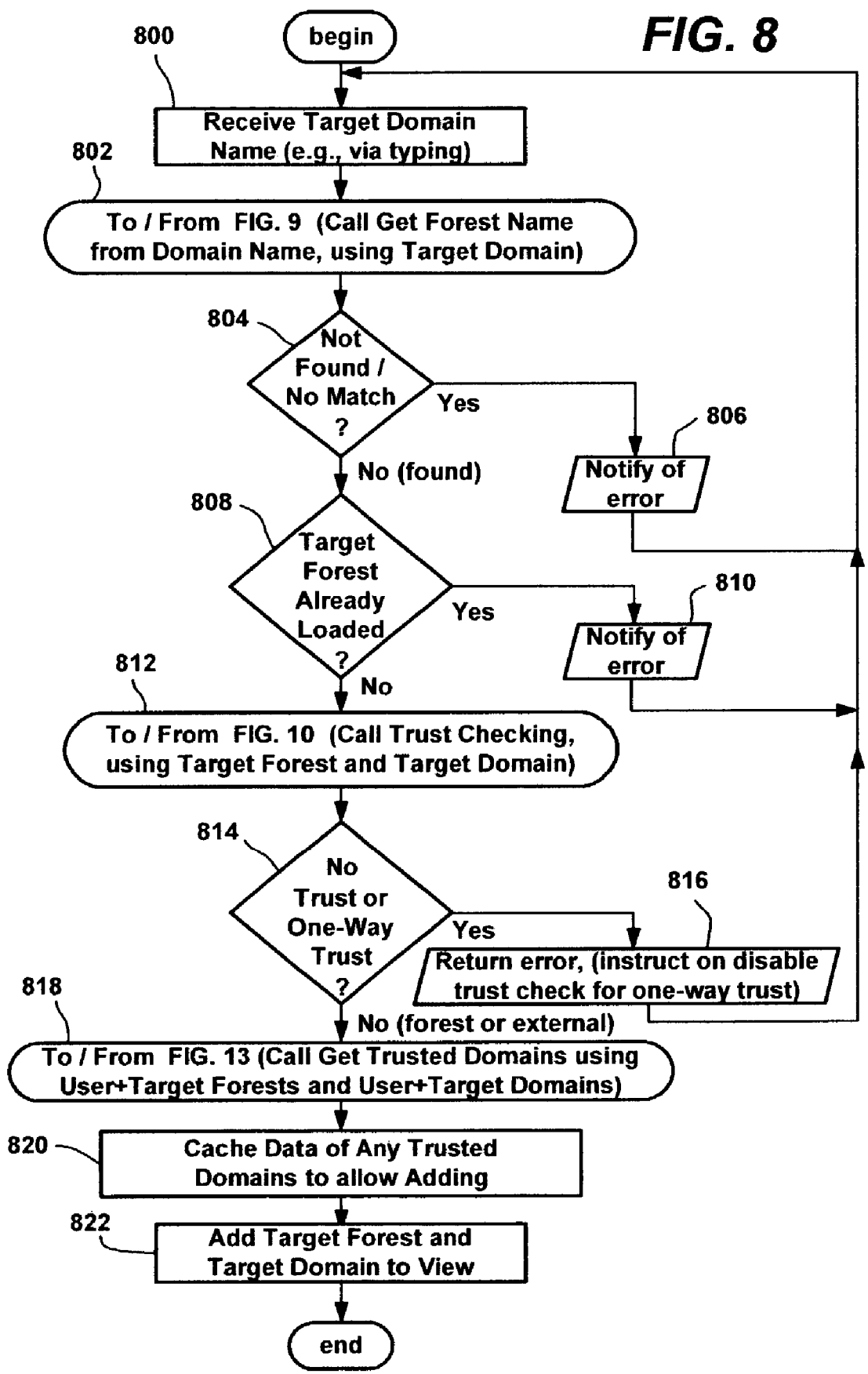
FIG. 8 is a flow diagram generally representing a process for adding a forest when given a domain, as well as obtaining a set of domains for that forest, in accordance with an aspect of the present invention.

More particularly, FIGS. 8-14 comprise flow diagrams by which a target forest, and domains of that forest having an appropriate trust relationship, e.g., via two-way forest-level trust or two-way external (domain-level) trust with specific domains, may be located for display and/or selection. This functionality for returning a forest name from a domain name may be incorporated into an application programming interface (API) or the like that the user interface can call. Note that FIG. 8 is primarily directed to obtaining a forest name when the administrator supplies a domain name, such as via typing, and thus some or most of FIG. 8 may be skipped over depending on how much information is obtainable in an environment that provides lists of available forests. For example, in an environment in which all forest names are made available to a browsing mechanism regardless of trust, then once the forest name was selected via the browsing mechanism, the process of FIG. 8 could be entered at step 808 (although a target domain may also need to be similarly selected). If only forest names that have a trust relationship with the user forest or domain are available to the browser, then after selection, the process of FIG. 8 could be entered at step 820, (although a check similar to that performed by step 808 may also be performed to avoid attempting to add a target forest that already has been added to the view, and a target domain may be needed). In any event, the present invention will be described with respect to an administrator supplying a target domain name, such as by typing one in, as represented by step 800 of FIG. 8.

Figure 9:
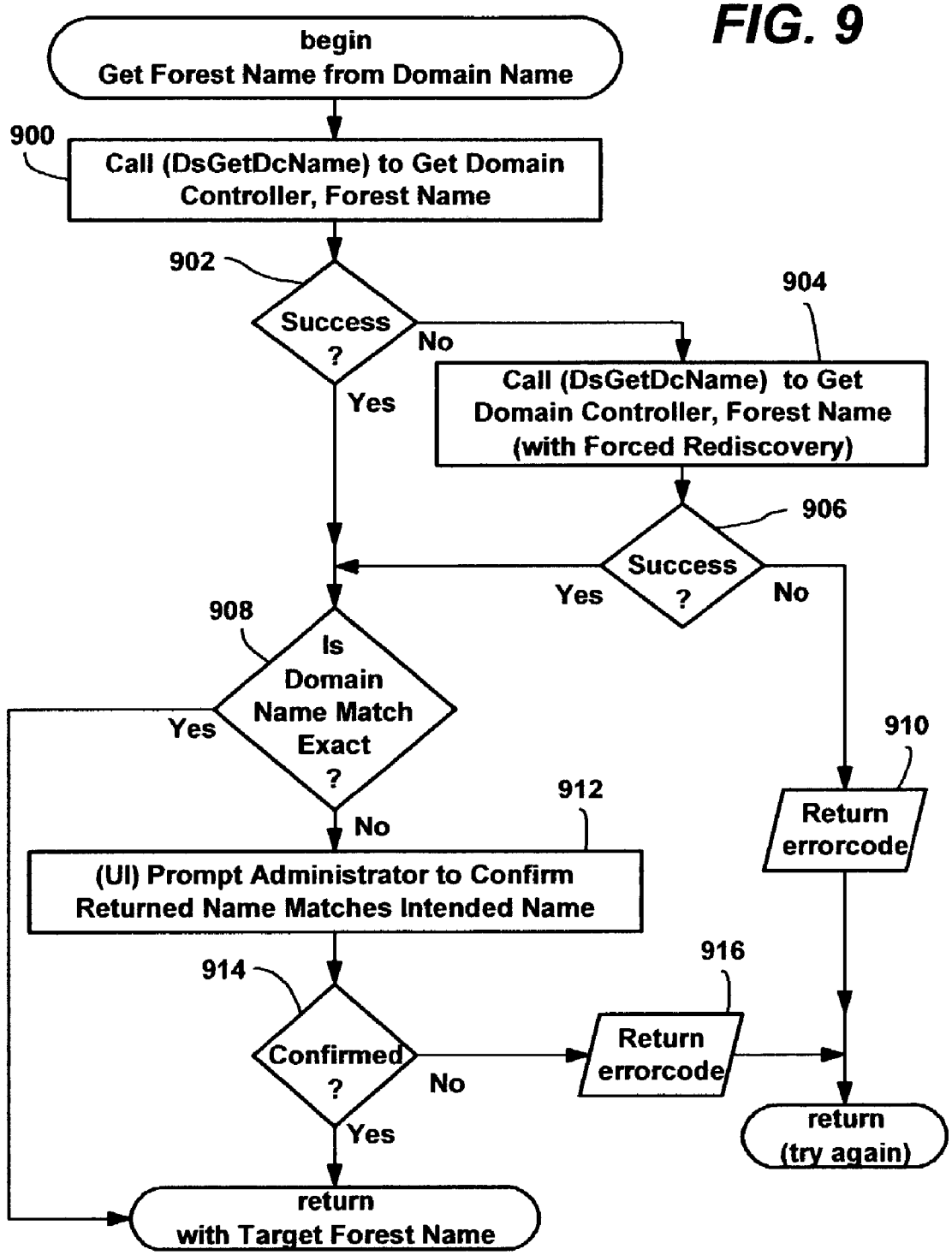
FIG. 9 is a flow diagram generally representing a process for obtaining a target forest name when given a target domain name, in accordance with an aspect of the present invention.

To determine a forest name from a domain name, step 802 represents calling a function provided by the group policy management console 212, as represented in FIG. 9. This function provides logic that leverages published APIs to determine the forest name. More particularly, at step 900 of FIG. 9, the process calls the DsGetDcName( ) function of the directory service, which returns the DNS forest name and DNS domain name if found, as evaluated at step 902. If a name is found, the process branches to step 908, as described below. If not found, it is possible that the name was not recognized in the directory service cache, which caches such information, but still may be valid in the network. Thus, if not found, step 902 branches to step 904 to again call the DsGetDcName( ) API, this time with an option that causes the directory service to look beyond its cache for the name, e.g., a forced rediscovery is requested. If this second attempt fails as evaluated at step 906, an appropriate error is returned (at step 910, which returns to step 804 of FIG. 8 and then to step 806) to notify the administrator that the supplied name was not recognized. The administrator can then try re-typing to provide a corrected domain name, as desired.

Returning to FIG. 9, when the DsGetDcName( ) API has successfully returned with a name as evaluated at step 902 or step 906, step 908 tests for whether the returned name data exactly corresponds to the domain name supplied. Note that as mentioned above, there are two ways for an administrator to provide a domain name, that is, as a NetBios name (which is a shorter name) or as a full DNS domain name, which is exact. If not an exact match with what was returned, step 912 prompts the administrator to confirm that the returned name matches the intended name, (e.g., because a NetBios name is not guaranteed to be unique among different forests, so the information returned may not match what the administrator intended). If not confirmed as determined at step 914, the process returns an errorcode to step 804, where the administrator can then try a different (e.g., exact DNS) domain name, as desired. Note that the administrator need not be given an intermediate explanation dialog at this time, e.g., if the administrator chooses "No" to the confirmation, the user interface may immediately return the administrator to the Add Forest/Enter Domain dialog of FIG. 7.

If the name was exact at step 908, or was confirmed at step 914, the process returns to FIG. 8, step 804 with a DNS forest name and DNS domain name. Note that from this point forward, the exact DNS name is used for domains, and the short name (if one was supplied) is no longer used in the process. At this point, the target domain and target forest have been identified, and thus step 804 branches to step 808.

Figure 15:
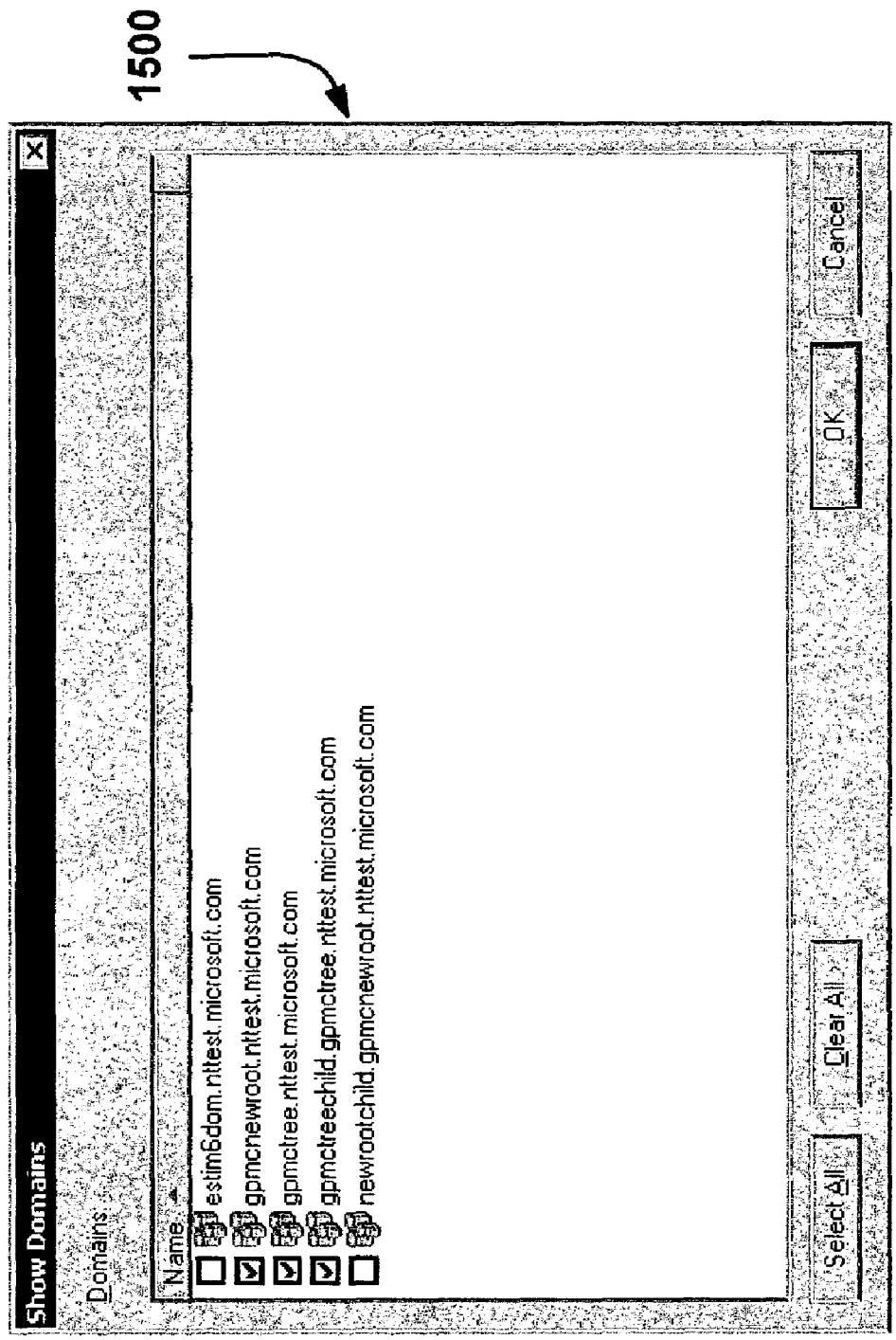
FIG. 15 is a representation of a dialog used to add a domain to a management view, in accordance with an aspect of the present invention.

Step 808 tests for whether the administrator has typed a domain name that corresponds to a forest that has been previously loaded in the viewed hierarchy. In such an event as detected at step 808, the administrator is notified via step 810 that the mechanism for adding domains when its forest already is present in the view, is to be performed by another mechanism. For example, the user can navigate to the "domains" node of a forest in the tree area, right-click or press shift-F10 (the accessible shortcut for activating a context menu), choose a "show domains" command, and be presented with a dialog 1500 that shows list of trusted domains that can be added as represented in FIG. 15. The administrator then selects one or more domains from that list, e.g., via checkbox selections. As can be readily appreciated, instead of a right-click, the user can alternatively request a similar show domains via other known mechanism, e.g., via a menu command, clicking an appropriate icon, and so forth.

Figure 10:
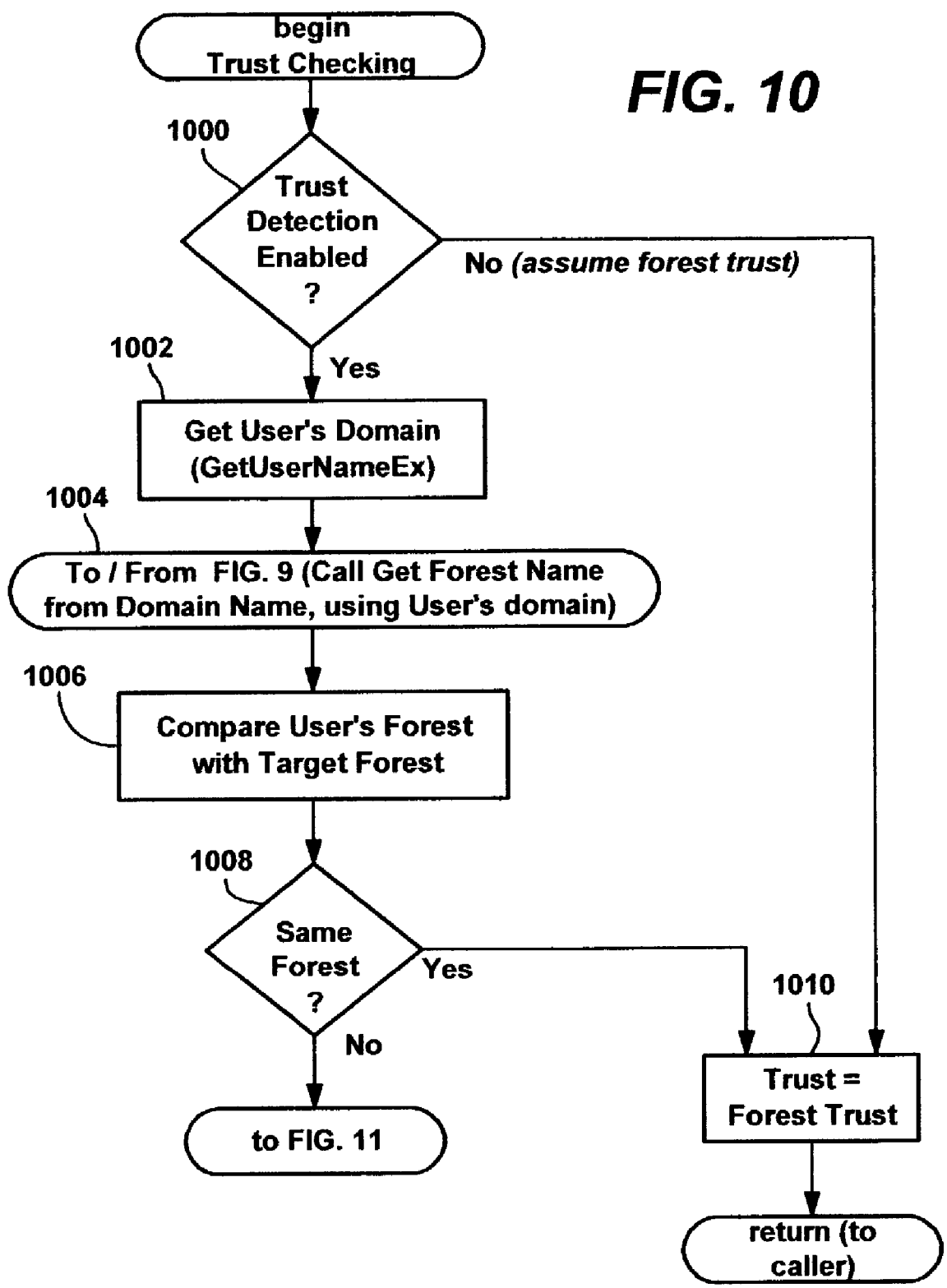
FIGS. 10-12 comprise a flow diagram generally representing a process for determining a trust relationship between a user's forest/domain and a target forest and domain, in accordance with an aspect of the present invention.
Figure 11:
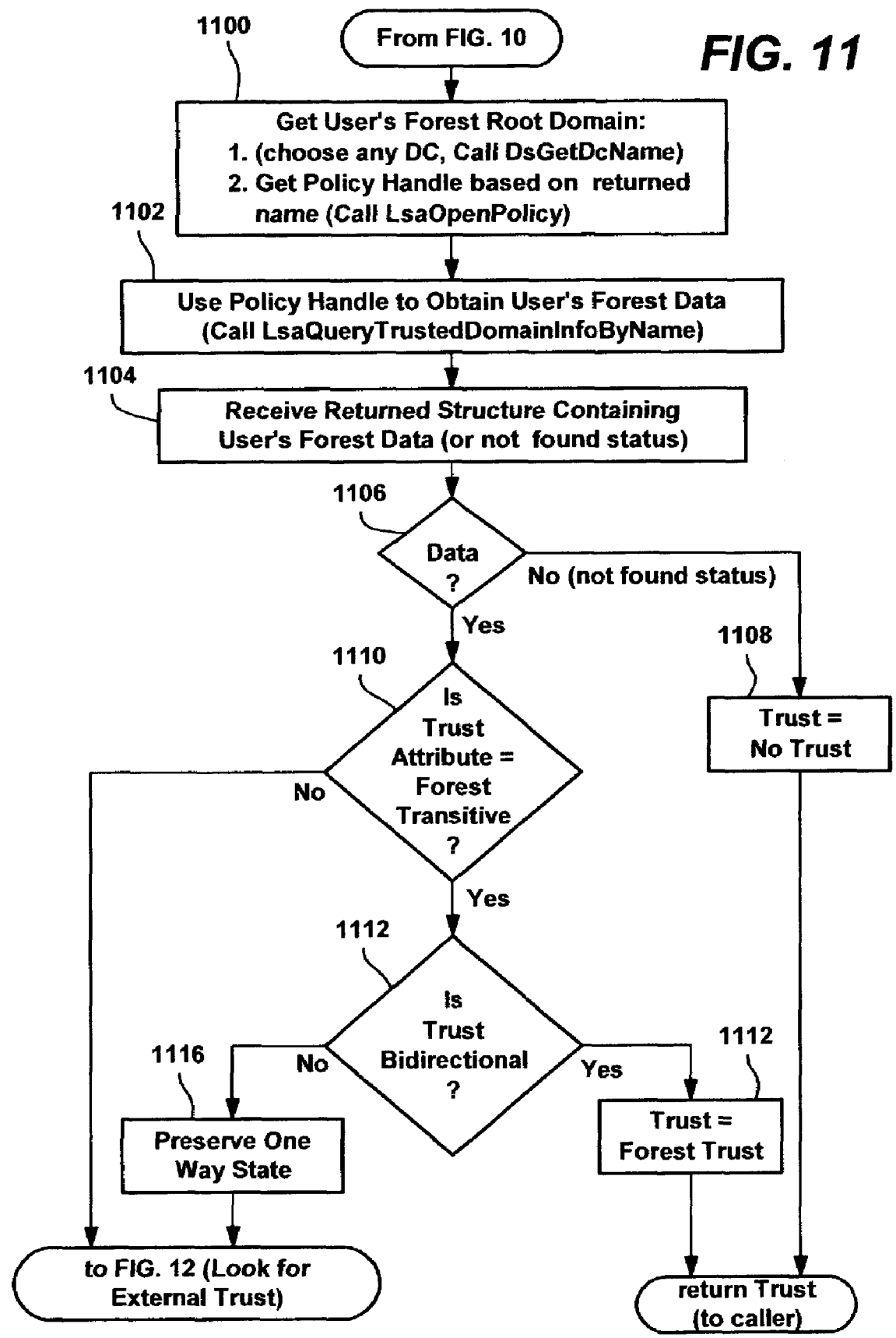
Figure 12:
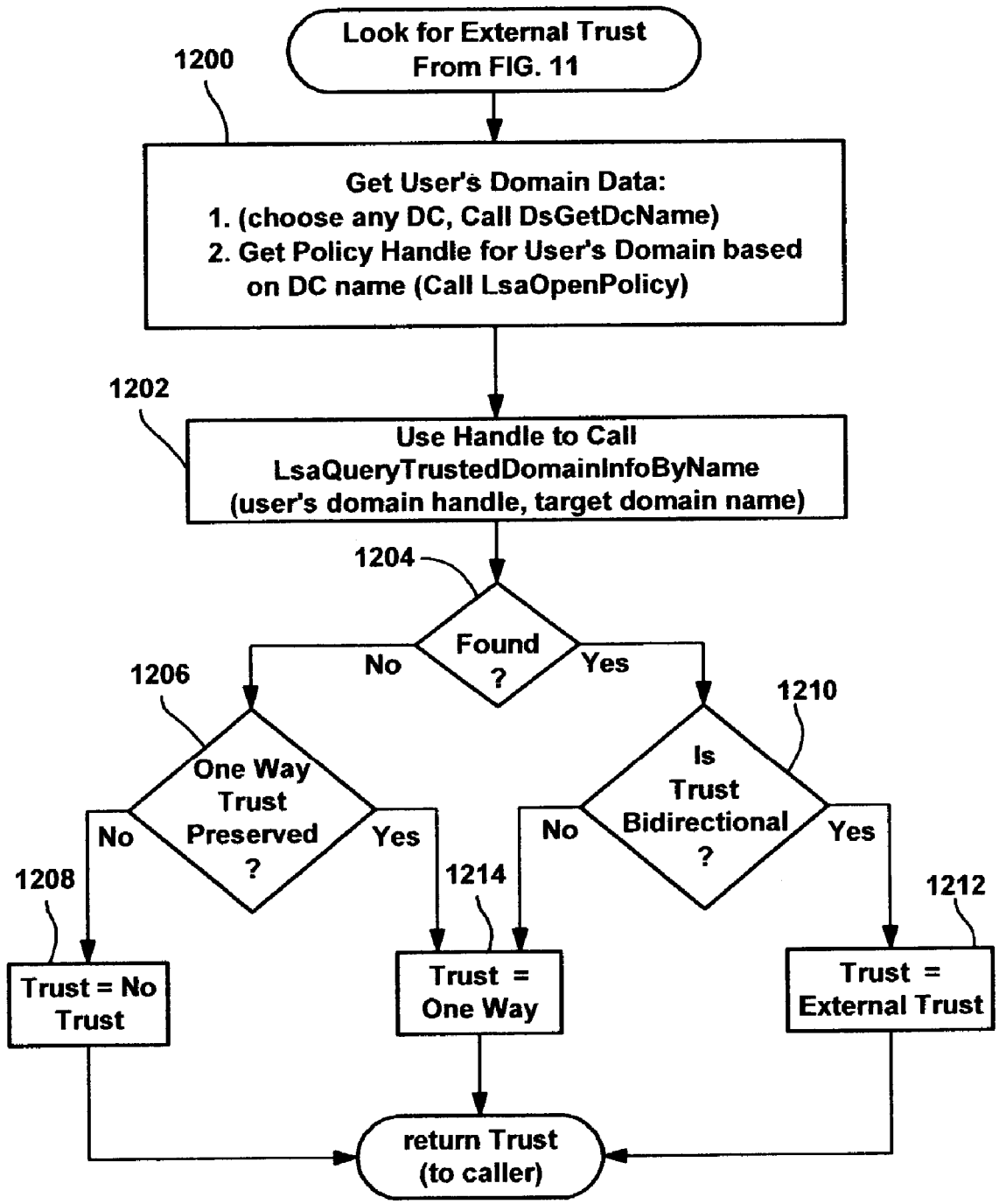

In a situation where the forest was not already loaded in the view, step 808 proceeds to step 812 of FIG. 8, which represents calling another function provided by the group policy management console 212, to check for trust relationships, as represented by FIGS. 10-12. In general, the trust checking function provides logic and leverages published APIs to return one of four levels of trust, including no trust at all (at one extreme), and forest (transitive) trust (at the other extreme) in which bidirectional trust is present between the target forest and the user forest, and thus between any domains in their respective forests. If there is trust but it is not forest trust, there may be bidirectional domain-to-domain trust that was explicitly set between at least one domain in the target forest and the user's domain, referred to as external trust. There is also a type of trust referred to as one-way trust, which may be between forests and/or domains, in which one trusts the other but not vice-versa. One-way trust is generally treated as no trust, except that the administrator is informed of the one-way trust relationship instead of the no trust condition, and is instructed of the ability to disable trust-checking if the administrator wants to add the target forest and its domains to the view (effectively as if there was a forest-level trust relationship with the user forest).

Step 1000 of FIG. 10 begins the described trust checking process, representing the test for whether trust detection is enabled. For example, this is a property setting or the like accessible to the administrator via an options menu, with trust detection enabled by default, that the administrator can toggle via a checkbox. If the administrator has toggled this setting to disabled, forest trust is assumed by step 1000 branching to step 1010. As described above, this gives the administrator the ability to attempt to add any forest and its domain or domains to the treeview, regardless of its actual trust relationships with the user forest and its domain or domains, although access to those entities is still enforced by other security mechanisms.

If trust detection is enabled at step 1000, step 1002 is instead executed to obtain the administrator's user domain. This step calls a published API, GetUserNameEx( ) for the name. With the domain name, the forest name can be obtained by calling the function described in FIG. 9, above. Note however that the domain name returned by the GetUserNameEx( ) function should exactly match the name returned by the DsGetDcName( ) function, and thus there will be no prompt at step 912. Note that although not shown, the Get Forest from Domain process of FIG. 9 can be informed (e.g., flagged) when the user interface dialog of FIG. 7 is calling versus when the trust checking process is calling, so that a prompt will not appear when not desired, such as if the trust checking process has called for the name but the returned name data is corrupted (which can be handled as an error condition, not a confirmation condition).

In the typical non-error case, the administrator's user forest name and user domain name will be returned in response to the call from step 1004, whereby step 1006 will be executed to compare the user's forest name with the target forest name (which was earlier returned in response to the call from step 802). If they are the same forest as tested at step 1008, e.g., the user supplied a target domain that was in the user's forest, there is forest trust by definition (since every domain in a given forest has trust to every other domain in that forest), and step 1008 branches to step 1010 to return the proper trust level (forest trust) to the caller, in this example, in response to the call of step 812. If not, step 1008 instead branches to step 1100 of FIG. 11.

Note that if forest trust exists, then all the domains in the forest may be enumerated and presented as a list to the caller, who will have access any domain in that forest. However, if there is instead external trust, then simply enumerating all the domains in that forest is not sufficient, because the caller only has access to domains to which there are explicit external trusts, e.g., a forest may include domains A, B, C, and D, but an administrator may only have external trust to A and B, and would thus be shown only domains A and B as existing in that forest, since the administrator does not have access to C and D.

Step 1100 of FIG. 11 is directed towards obtaining the trust attributes of the forest root domain of the user, (because the user may be in a child domain of the forest), which contains trust information about the user forest, including trust relationships with other forests. To this end, step 1100 chooses any domain controller, again calls DsGetDcName( ) (with appropriate data such as the forest's name to get the forest's root domain name), and, based on the returned name, obtains a policy handle corresponding to the user's forest root domain by calling an LsaOpenPolicy( ) API, another published API. With this handle, step 1102 obtains the user forest data relating to trust relationships by calling (with the target information) yet another published API named LsaQueryTrustedDomainInfoByName( ), which returns a data structure containing information describing the trust relationship between the user forest and the target forest. Note that in the case of an error, e.g., the target forest was not recognized, the process branches to FIG. 12 to look for external trust.

If the data structure was returned, as determined at step 1106, within the data structure, a trust attribute (flag setting) named TRUST_ATTRIBUTE_FOREST_TRANSITIVE indicates whether there is forest transitive trust between the target forest and user forest, which is evaluated at step 1110. If not, there is no forest trust, and the process branches to FIG. 12 to look for external trust.

Conversely, if at step 1108 the trust attribute indicates that there is some forest trust, the direction of that trust is not yet known. However, another available flag contains information that indicates whether the trust is bidirectional, that is, the TRUST_DIRECTION_BIDIRECTIONAL flag. If the flag indicates bidirectional at step 1112, then the trust is forest trust, and the trust checking process returns the trust result to the caller as forest trust via step 1110 branching to step 1112. If not bidirectional, there is at least some forest trust, but it is one-way trust. Step 1112 branches to step 1116 in this situation, which temporarily flags the presence of the one-way trust in case that is the only type of trust that there is, before branching to step 1200 of FIG. 12 to look for external trust.

As is understood, FIG. 12 is only executed when forest trust was not found, because if forest trust was found, there would be trust between the user's domain and the domains in the target forest, including the target domain. Thus, FIG. 12 looks for external trust between the user domain and the target domain when forest trust does not exist between the user forest and the target forest. As described below, external trust is sufficient to add the target forest and target domain to the administrator's treeview.

Step 1200 is thus performed to get the appropriate trust information maintained in the user domain node information for the user domain. To this end, step 1200 chooses any domain controller, again calls DsGetDcName( ) (with appropriate domain data), and, based on the returned name, obtains a policy handle corresponding to the user's domain by calling the LsaOpenPolicy( ) API. Note that this is similar to step 1100 described above, however this time the user domain rather than the forest root domain (which can be the same) is the level at which the information is being obtained. With the returned handle, step 1202 obtains the user domain data relating to trust relationships by calling (with the target domain information) the LsaQueryTrustedDomainInfoByName( ).

Step 1204 tests whether a trust relationship is found between the user domain and the target domain. If not, step 1204 branches to step 1206, which tests whether a one-way forest trust was previously detected and flagged (at step 1116 of FIG. 11). If not, the trust result that is returned is no trust via step 1208, otherwise the trust result that is returned is the one-way trust, via step 1214.

If trust between the user domain and target domain was found at step 1204, the process instead branches to step 1210 which tests for bidirectional trust. If not bidirectional, returned trust result is one-way via step 1214, otherwise the returned trust result is that there is external trust between the domains. Note that the trust checking of FIGS. 11 and 12 attempt to return the best trust result possible between the user and target forest objects or the user and target domain objects, that is forest trust if present, if not then external trust if present, if not then one-way trust if present, and lastly no trust. In any event, the trust checking process returns to the caller with a trust result, which in the present example description transfers control back to step 814 of FIG. 8.

Step 814 tests whether the returned trust result was no trust, or one way trust. If so, the target forest and target domain will not be added to the view, as step 814 branches to step 816 to notify the user of the lack of a proper trust relationship. If one-way trust exists, this notification may explain this condition to the administrator, along with instructions as to how to disable trust checking (and thereby assume forest trust to bypass the trust checking mechanism) if the administrator still wants the target forest added.

If the trust result is external trust or forest trust (whether actual or assumed), step 818 (described below) is executed, which calls to obtain a list of all the domains if forest trust, or all the domains with which there is external trust, which is then cached in association with the forest at step 820, as described below. The list can be used to populate dialog, (for example, a "show domains" dialog as shown in FIG. 15) that allows an administrator to browse the trusted domains in a forest at any later time and add (and remove) any of these domains under the forest, as desired. Removed domains are still cached, they are just not displayed until the administrator re-adds them to the view. Step 822 represents adding the target forest and the target domain (the domain was received at step 800) to the treeview. At this time, the administrator can now view and manage the target forest and target domain.

With respect to sites, sites are also cached for the administrator to later browse as well as add and remove, e.g., individually into a custom view for that administrator, using for example a "show sites" dialog. However, unlike domains, there is no trust-handling logic for sites, since trust is defined between domains, not sites. Thus the sites available under a forest are cached as a whole, and from there selectively added and/or removed from the console view by the administrator.

Figure 13:
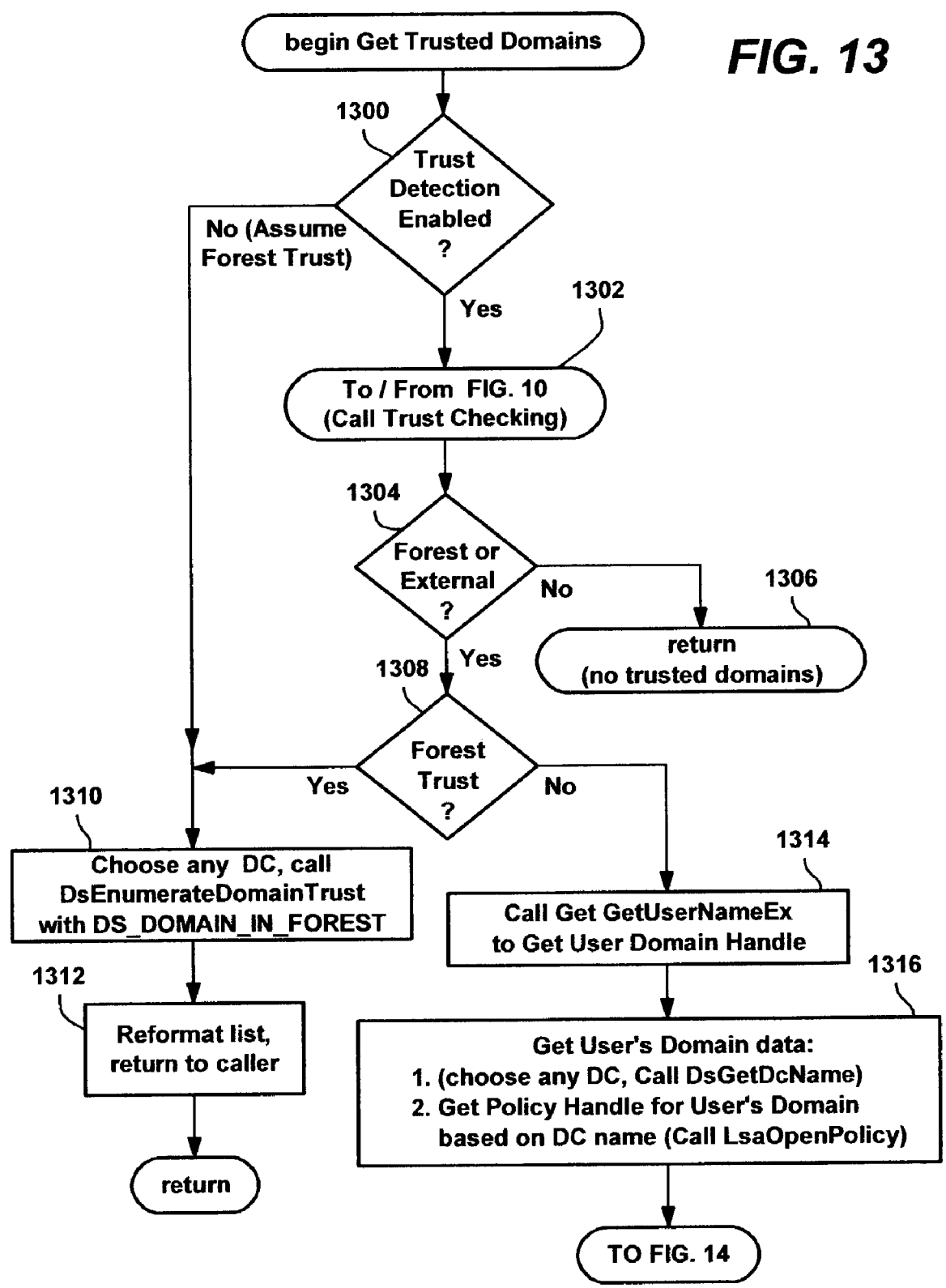
FIGS. 13 and 14 comprise a flow diagram generally representing a process for determining a list of the domains that have a proper trust relationship between a user's forest/domain and a target forest and domain, in accordance with an aspect of the present invention.
Figure 14:
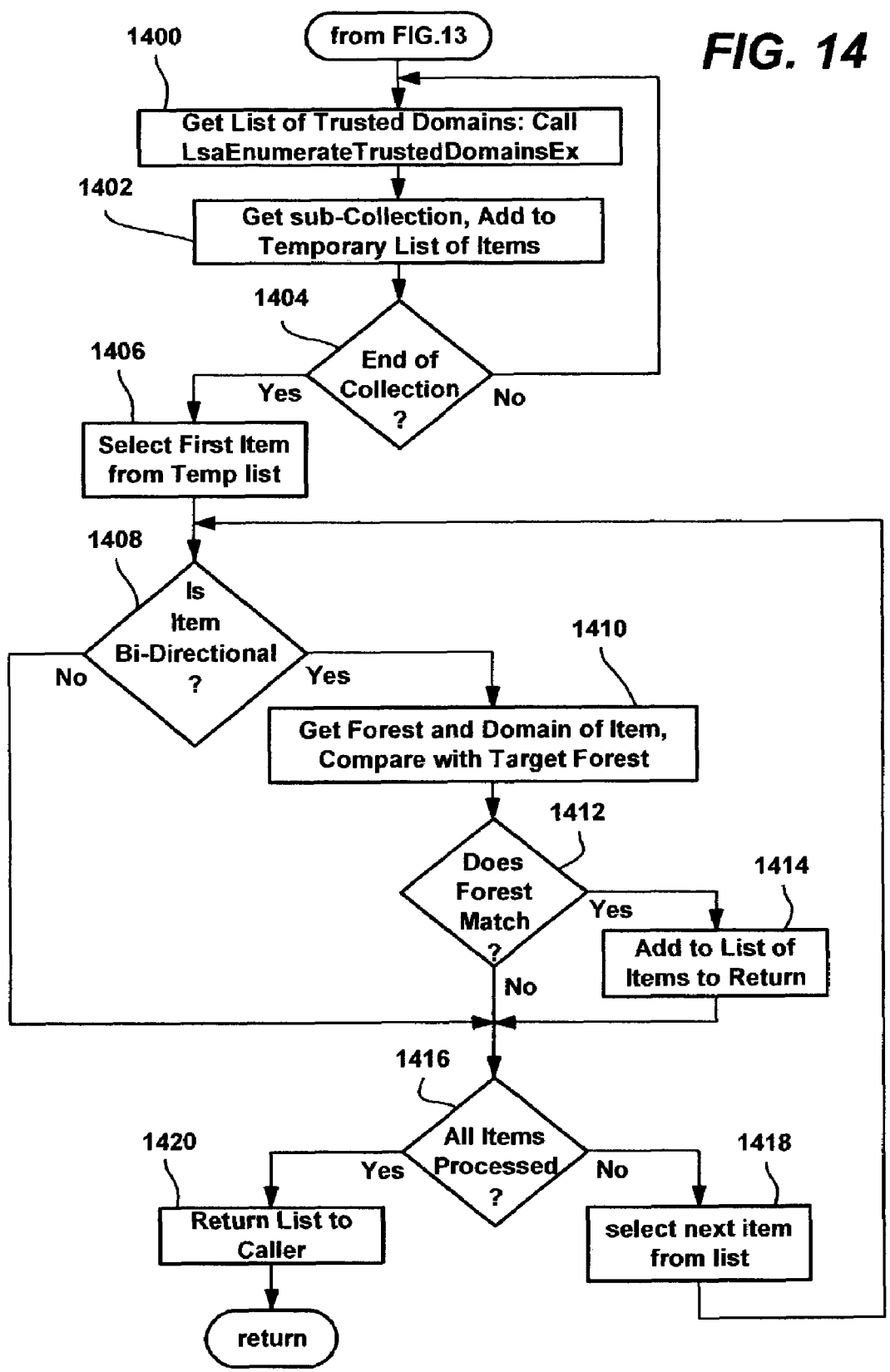

FIGS. 13 and 14 represent the process of obtaining the list of trusted domains are obtained, e.g., when called via step 818. Note that this "Get Trusted Domains" process is an independent function, and thus does not benefit from the operations of previous functions, although such a process is feasible. Thus, FIGS. 13 and 14 repeat some of the steps previously described, essentially to take any target forest and return a list of domains therein which have a bidirectional trust relationship with the user's domain.

Step 1300 tests whether trust detection is enabled. If not, forest trust is assumed, and the process branches to step 1310 which, by calling any domain controller, obtains a list of domains in the target forest. This list is returned to the caller, generally after some suitable reformatting at step 1312.

If trust checking is not disabled, step 1302 is instead executed to call the trust checking process of FIGS. 10-12, as described above, to find out what the trust is between the user forest and domain and the target forest and domain. Note that if called from step 818, there will be either forest or external trust, however this Get Trusted Domains process makes no assumptions about how or when it is called, and thus calls for its own trust checking.

As described above, the trust checking process provides a trust result, which is evaluated at steps 1304 and 1308 (which when coded may comprise a switch statement rather than separate evaluations as shown). In the case where the trust is not forest or external, (that is, there is no trust or one-way trust) step 1306 returns an empty list, as there are no trusted domains. Note that an empty list should not normally be returned if called from FIG. 8, in which forest or external trust has already been established, however this function can be called by other processes. In the case where there is forest trust, steps 1310 and 1312 are executed, which returns a list of each domain in the target forest, since there is a trust relationship between the forests and thus between the user domain and the domains in the target forest.

In the case where there is external trust, the user domain's trust data needs to be checked against each domain for an external trust relationship. Steps 1314 and 1316 represent obtaining this data; since this part of the process has previously been described, it will not be described again for purposes of brevity.

FIG. 1400 represents obtaining the list of trusted domains, that is, a list those domains having a two-way external trust relationship with the user domain. The published API function named LsaEnumerateTrustedDomainsEx( ) provides this list in one or more sub-collections; in general to obtain the full collection, this function has to be repeatedly called unless and until it indicates the end of the collection has been returned. Steps 1400, 1402 and 1404 represent this call in a loop in order to build up a comprehensive collection in a temporary list.

When fully collected, the temporary list is then processed from the first item therein (step 1406) to determine which ones correspond to a bidirectional trust relationship with the user's domain, as tested for at step 1408. Step 1408 essentially discards those items where there is not bidirectional trust.

The temporary list also contains items that are not domains in the target forest. Thus, for those items that are bidirectional at step 1408, the forest of the item is checked against the target forest, and only those that match are added to the final list to be returned, which will list any domains in the target forest with which there is two-way external trust. Steps 1416 and 1418 repeat the item processing until none remain. Step 1420 represents the list being returned in response to the call, e.g., the call placed at step 818. Note that the list of domains may be empty, but if not, is cached along with associated data so that the administrator can add trusted domains at any time via the show domains dialog 1500 of FIG. 15. This allows the administrator to customize which domains within a given forest are shown in their console as needed.

When a domain (or site) is added under a forest, the information in that domain, including organizational units, group policy objects of that domain, and links to group policy objects, may also be displayed. Group policy objects that are stored in the domain, whether or not linked to any SOM, appear under the domain under a node called "group policy objects." Links to these group policy objects also appear in the context of where they are linked (e.g. to one or more sites, domains, OUs). Any WMI filters also appear under their corresponding domain nodes. Note that group policy objects and WMI filters are preferably presented under a parent domain after any links to group policy objects or child organizational units are presented.

Figure 16:
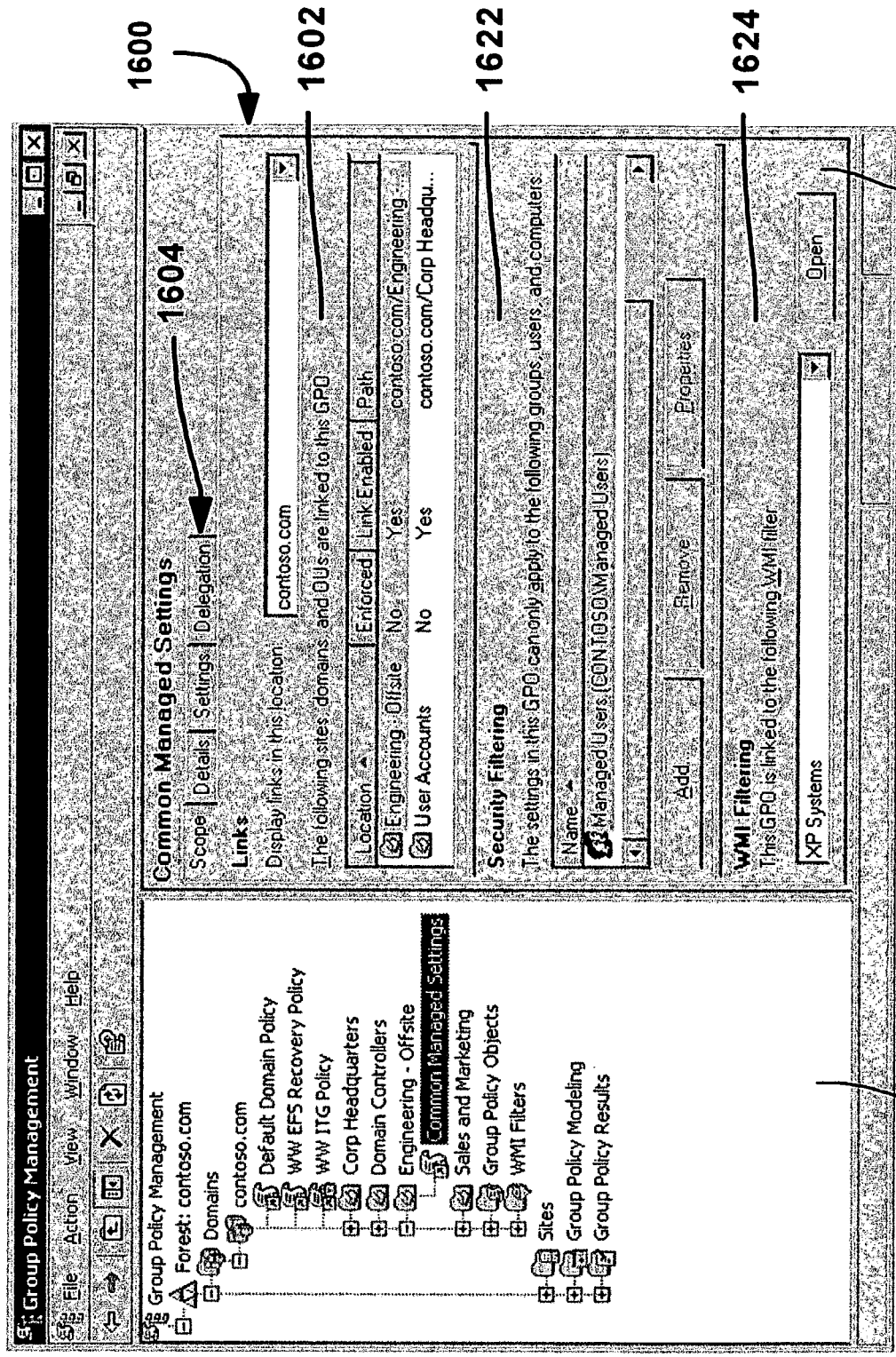
FIGS. 16-22 are various representations of user interface displays including tab-selected task views in a result pane area for accessing and managing data, in accordance with an aspect of the present invention.
Figure 17:
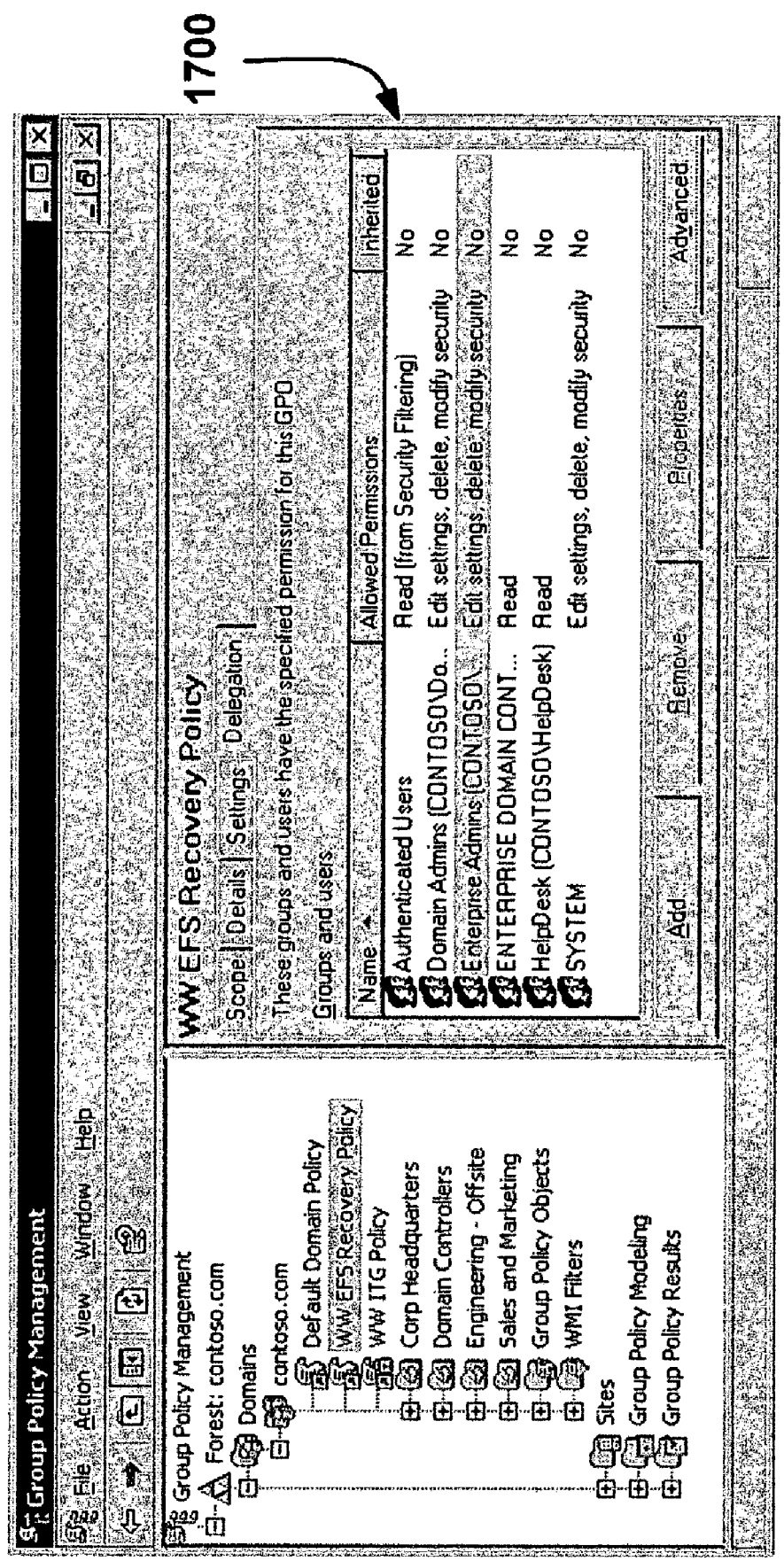
Figure 18:
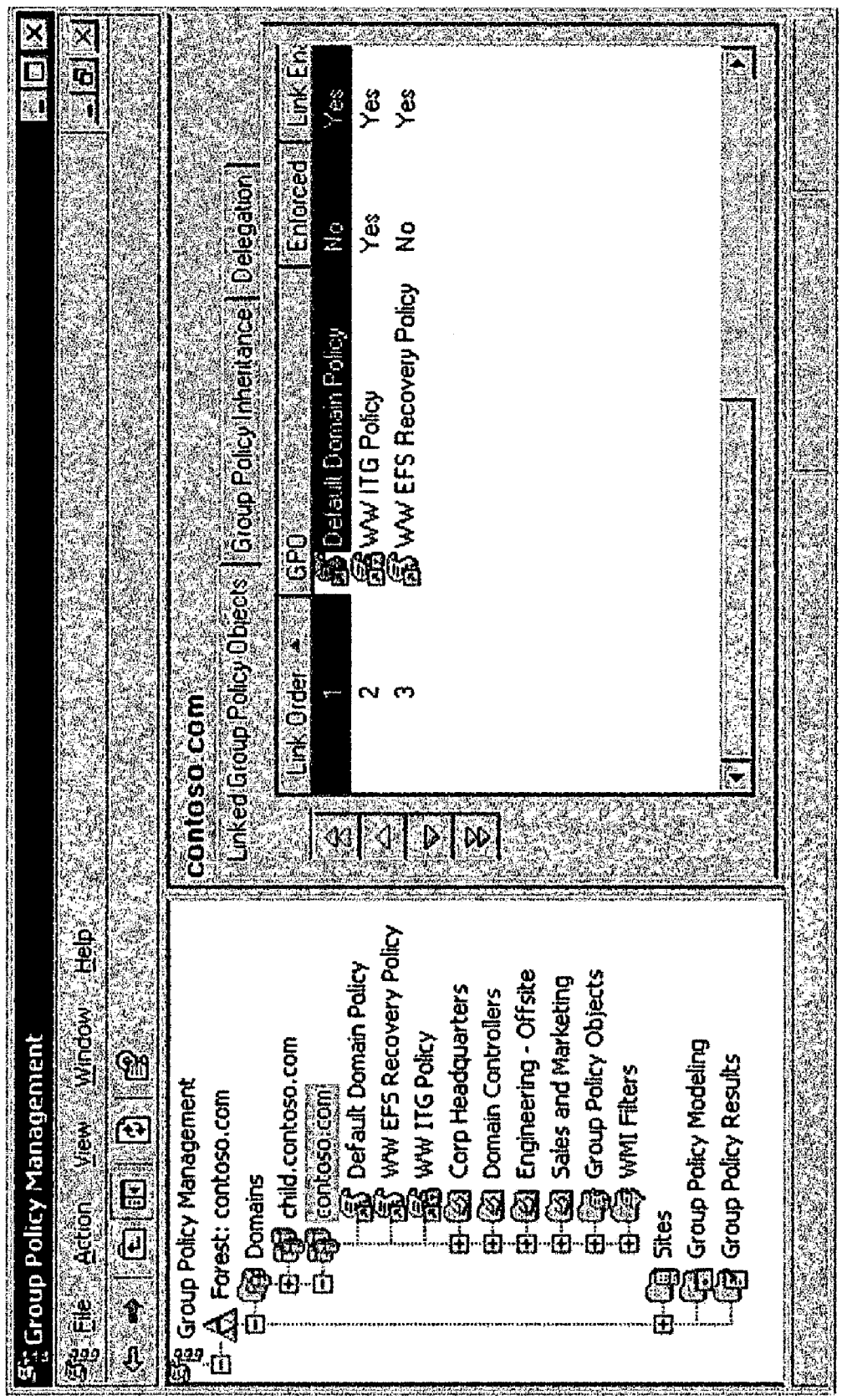
Figure 19:
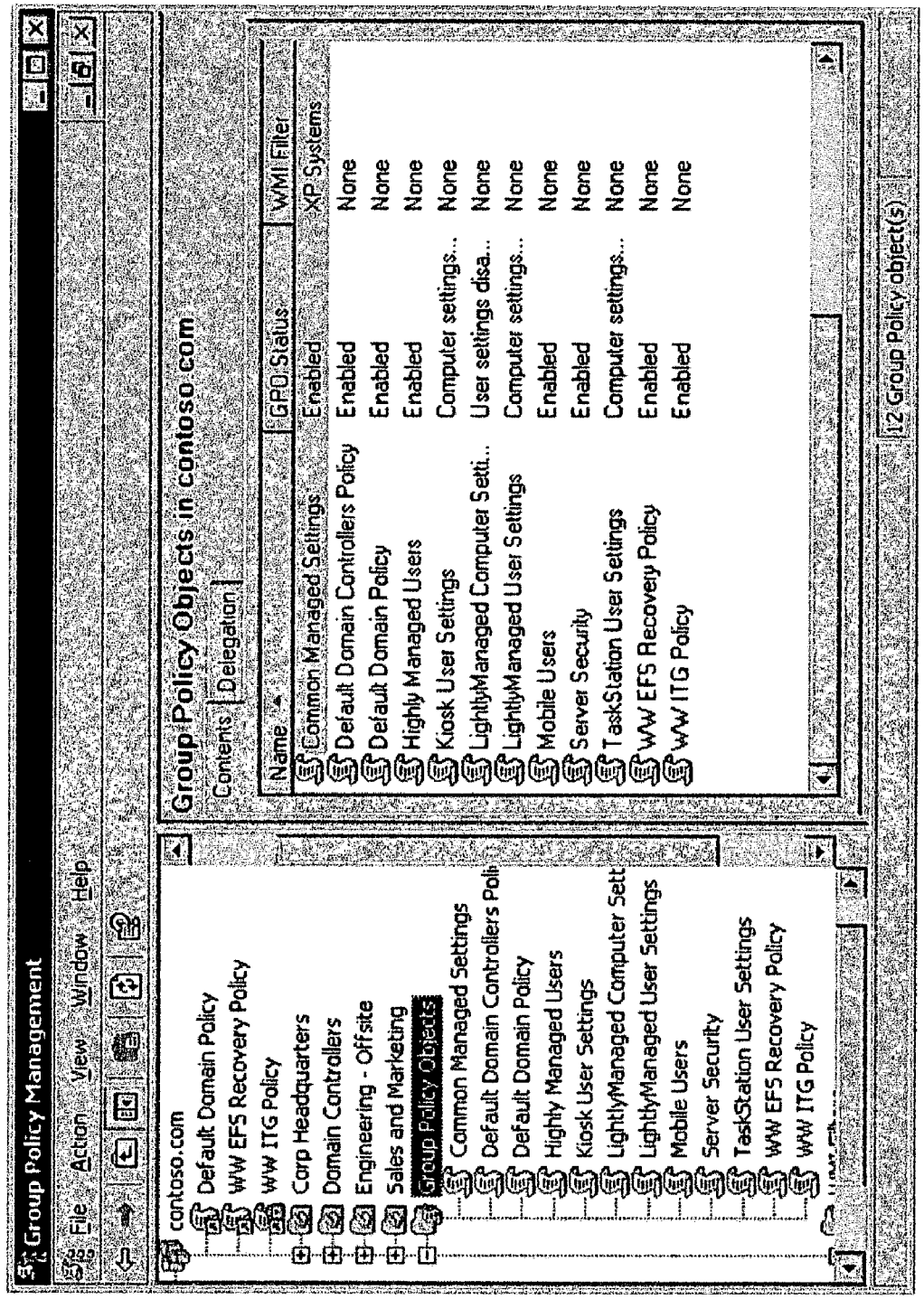
Figure 20:
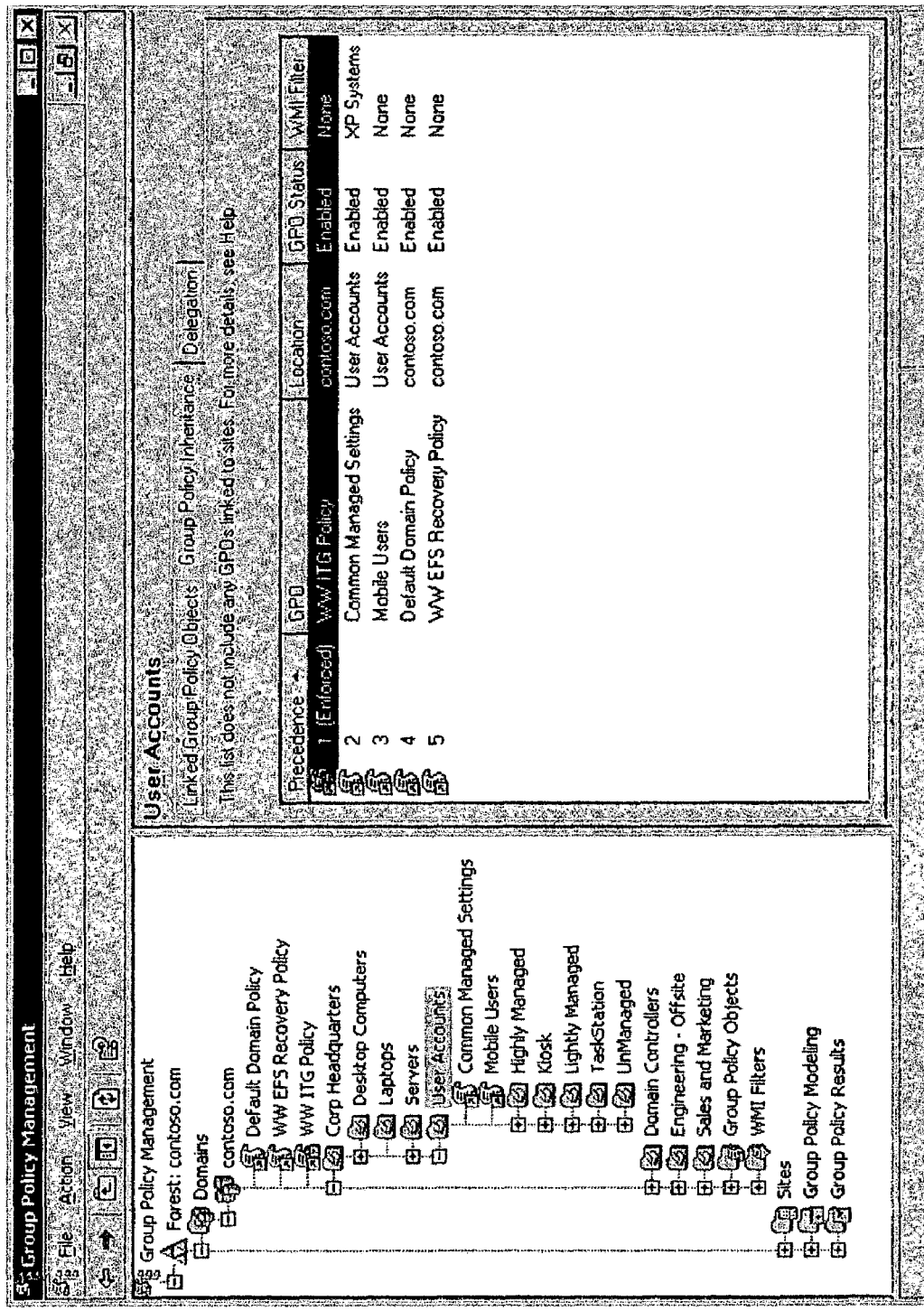

Links to group policy objects appear slightly differently from actual group policy objects when displayed in the treeview 502, including a small boxed arrow (indicative of a shortcut) for links (but not group policy objects) as generally shown in FIGS. 16-22, that indicates to administrators that they are actually operating on a link to a group policy object, as opposed to the group policy object itself. Additional modifiers may be shown on this icon as well, to indicate state of the link, for exampled an enforced link is represented by a padlock overlaid on the icon, and disabled link is shown as greyed. As generally shown in FIGS. 16-22, and more particularly in FIGS. 18 and 19, links are also distinguished from group policy objects by their location in the treeview, that is, actual group policy objects are shown under the "group policy objects" node for a given domain (FIG. 19), whereas links appear as child nodes of a site, domain, or organizational unit (FIG. 18). Further, the context menu which appears an item is selected in the treeview is different depending on whether group policy object link or a group policy object has been selected. For example, right clicking a group policy object exposes options that are primarily relevant for the actual group policy object (such as backup and restore management functions), whereas right clicking a group policy object link exposes options that are relevant to managing the link. Note that some options, such as "Edit" are available on both context menus, and further, that when a link is selected, the right side area 504 provides access to information about the actual group policy object to which the link connects one or more sites, domains and/or organizational units. Indeed, the appearance of the right side pane 504, described below, is substantially identical for either a link and a group policy object, except that a warning may be given (at least until deactivated) that informs the administrator when he or she is working with a link to a group policy object, rather than with the group policy object. Links to a group policy object that is inaccessible (e.g. access to the group policy object is denied) may be shown as inaccessible, and links to group policy objects that no longer exist may be marked as not found. Limited information that is known about such links, e.g., the GUID of the inaccessible group policy object (but not its friendly name and other data, which the administrator does not have access rights to see) may be provided, so that the administrator has some basis for finding out about that inaccessible group policy object.

In accordance with another aspect of the present invention, there is provided an improved mechanism for intuitive interaction with the various tree node's data when selected and displayed in the result pane (right) view area 504. To this end, a tabbed view in conjunction with and improved display of the selected item's data are provided within the display area 504, as generally represented in FIGS. 16-22. Note that in one implementation, this is accomplished in accordance with MMC snap-in requirements in the result pane area 504 of the display, because the group policy management console 212 is able to be run as an MMC snap-in.

The tabbed view helps to overcome one of the primary complexities of managing group policy, namely that with group policy there are many related, but independent sets of data that need to be understood and managed by the administrator. For example, to understand which users and computers will receive the settings in a group policy object, the administrator needs to understand to which scope of management (SOM) object or objects the group policy object is linked, what are the security filters on the group policy object, and whether a WMI filter is linked to the group policy object. Significantly, this is grouped by task providing the information in one consolidated view. Other aspects of the group policy object are also important, for example, the settings in the group policy object, the delegation rights on the group policy object, as well as other important details such as version information, and these aspects are also grouped by task into a single consolidated view per task using these tabs.

To effectively manage this complexity, the present invention via the tabbed view organized generally around task provides a rich display of complex data in the result (right) display area 504. Note that in conventional MMC snap-ins, this area is used to display a single listview in the display area 504 that merely echoes data corresponding to the selected item in the treeview 502 (in the left pane), however this conventional listview approach does not fit the complex data model of group policy objects well. For example, to handle the above group policy-related data with a simple listview that merely echoed the tree information, the treeview would have to be expanded with several sub-nodes added for many of the core objects in the treeview, which would likely increase rather than decrease the overall complexity to administrators. Alternatively, various individual property pages and similar dialogs instead may be provided for each of these nodes, however this would also increase complexity by making the information harder to access. Further, with such an approach, the administrator would not have the needed information about a particular object in one location, but rather would need to navigate throughout the console and/or through various secondary dialogs to locate the information.

To provide the tabbed view, the present invention provides a customized user interface via controls (e.g., ActiveX® controls), which provide the needed functionality while at the same time operating properly in an MMC environment (because MMC supports such controls. The user interface 402 (FIG. 4) of the present invention presents data for a given object in the treeview 502 using multiple tabs, each of which are generally task-based, and can show independent data about the selected entity (e.g., object) in the treeview 502. A significant benefit provided by the present invention is that the administrator then has essentially all of the information for a given node (which is frequently an object in the directory service) in one location, namely the area 504, that is easily and intuitively accessible. The user interface also provides a new layout that more richly and clearly communicates the data.

The tabs essentially comprise buttons that can be actuated, (e.g., standard Win32 tab controls) which when actuated each bring a corresponding page of content (constructed from various controls) to the display foreground that provides a view of and access to information relevant to its respective task. By way of example, as represented in the display 1600 of FIG. 16, tabs 1604 are provided for a group policy object node, including a tab for scope, a tab for details, a tab for settings and a tab for delegation. The scope tab, shown selected in FIG. 16, aggregates and provides access to information about links, security filters and WMI filters in separate sections of the same displayed tab, which is needed by the administrator to understand who will actually apply the settings in the group policy object. For example, as also shown in FIG. 16, the links section can identify the sites, domains and organizational units linked to the group policy object. The security filtering section corresponds to information that indicates which users and computers in the scopes of management where the GPO is linked will receive the settings in the group policy object. The WMI filtering section shows that in this example, the group policy object is linked to a WMI filter named "XP Systems". Ultimately, the users and computers that receive and apply the settings in the group policy object is based on the intersection of these three criteria.

The details tab provides access to low level details about the group policy object, such as version numbers for the various components of the group policy object, the group policy object status, its GUID, domain, owner, created date/time, and last date/time of modification. The settings tab collects and provides access to the settings in the group policy object that will apply to the targeted users and computers. This tab shows an HTML report of the settings in the group policy object. The delegation tab, shown selected in the display 1700 of FIG. 17, provides access to information as to which administrator or administrators control this group policy object, and at what level they have control. Within each of these tabs, a customized user interface is provided that richly communicates the relevant data to the user. For example, on the delegation tab, such as the page 1700 shown in FIG. 17, the traditional ACL (access control list editor) has been abstracted to provide a task-based view of the permissions on a group policy object.

Figure 22:
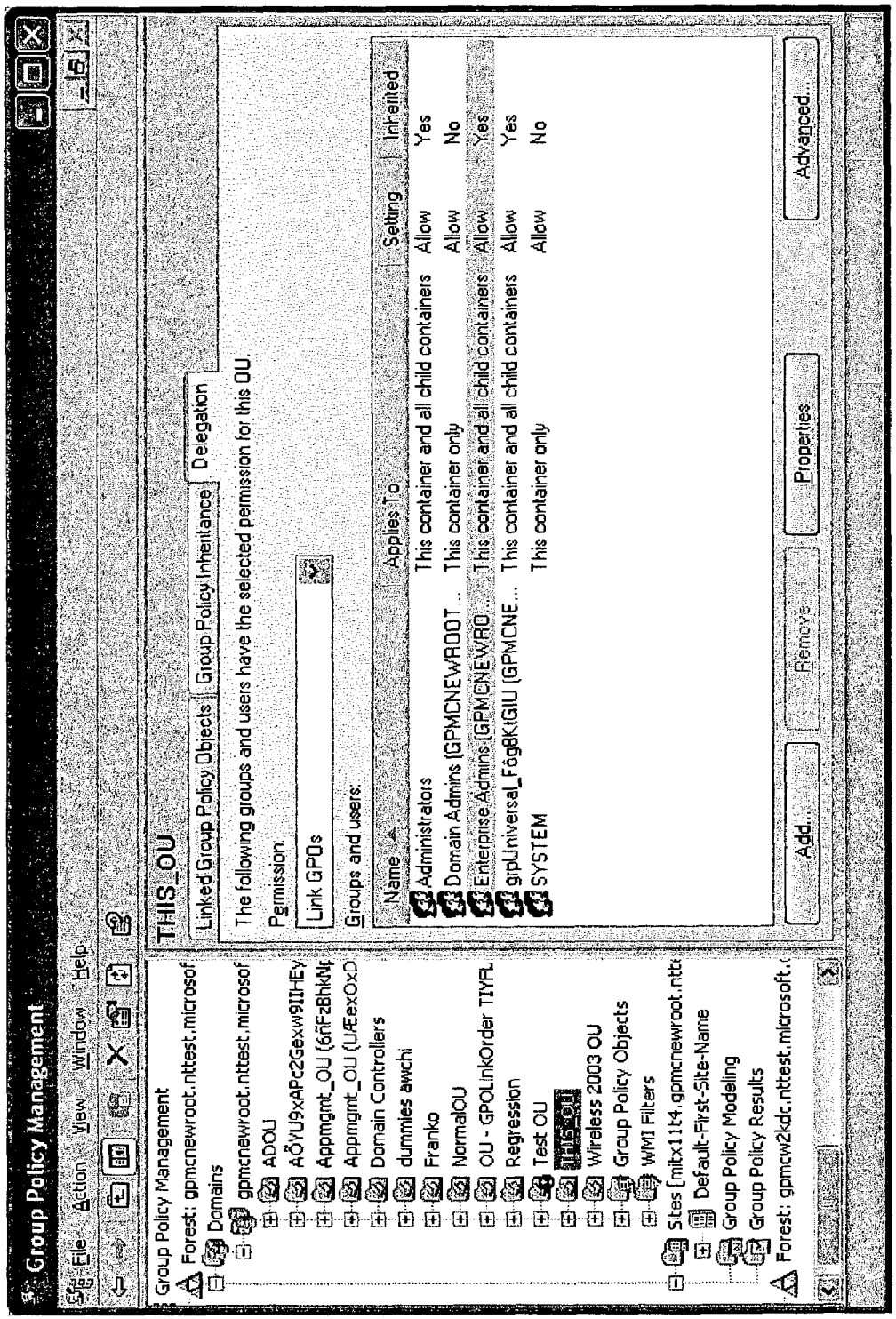

Other node types have a different assortment of tabs that are specific to the node type. Where possible, consistency of tabs across node types is maintained. For example, as with a group policy object node, many other node types have a delegation tab, e.g., each SOM node has a delegation tab to allow the administrator to manage, in a task-based fashion, delegation aspects related to group policy on that SOM, as shown in FIG. 22. In addition, the collection nodes for group policy objects and WMI filters show who has creation rights for these objects in a given domain. Thus, although there are many different node types, the consistency of the user interface helps educate the user on commonality where present, in this case, the commonality of the task, in this case, delegation.

While all possible tab views are not shown herein for purposes of simplicity, additional examples are provided in FIGS. 18-22. Note that as shown in the single-tabbed display of FIGS. 5 and 6, even if there is only one displayed representation in the area 504 for a particular selection in the treeview area 502, a single tab is still shown for purposes of consistency.

As described above, in one implementation, each of the tabs corresponds to a page constructed from ActiveX® controls that work with MMC. MMC publicly documents how MMC provides support for ActiveX® controls, and thus this will not be described herein for purposes of simplicity except to point out some of the features provided by such controls, as described below. For example, one feature provided by a control comprises a method for showing tri-state behavior of WMI filters in a single column. More particularly, in a result pane that shows information about multiple WMI filters, the administrator is shown whether each WMI filter is actually being used by a group policy object or by multiple group policy objects. Because only a single line and column are available for to display this data, this important information is shown by displaying the name of the group policy object GPO if the WMI filter was used by a single group policy object GPO, "none" if the WMI filter was not used at all, and "multiple" if the WMI filter was used by more than one group policy object. In general, it is expected that most WMI filters will be linked to only one group policy object, and hence this is optimization covers the majority of cases. In situations where a WMI filter does show the multiple condition, the administrator can easily discover the names of the multiple group policy objects to which that that filter is linked, e.g., by double clicking the WMI filter in the area 504, which then navigates the user to a node specific to that WMI filter.

In accordance with another aspect of the present invention, there is provided a mechanism in the form of reselect logic 460 (FIG. 4), that provides a smooth transitioning experience for the administrator as the administrator moves from one node to another while using the group policy management console 212. To this end, the reselect logic 460 maintains state across changes and uses that state to match it with the same information wherever it appears relative to the change, e.g., as different objects are selected, the reselect object works to leave the administrator in the same place (e.g., the same item in a list) as in the previous object, rather than lose this information (e.g., by moving to the first object in the list, for example).

The reselect logic 460 accomplishes this in a number of ways, including by maintaining information about the security principal when a security principal is selected, whereby the reselect logic 460 can thus reselect the security principal when the administrator user moves to a different object that also has the same security principal. In this manner, for example, if the administrator switches from one group policy object to another while working with a security principal on the delegation page, the same security principal on that delegation page is reselected and the transition between objects is smooth.

Further, the reselect logic 460 smoothes transitions by reselecting group policy objects that are linked to a scope of management (SOM) to try to keep the administrator focused on the same group policy object link, even though one group policy object link cannot necessarily be identified from another. More particularly, since identification is not possible, any links are discarded and repopulated as necessary, to put the administrator back on the same link.

A further way in which reselect logic accomplishes smooth transitioning is when the administrator user works with a report to expand it to the proper section. When this occurs, the reselect logic preserves state data so as to put the user back to the same position when the user comes back to the report after viewing a different object.

In accordance with another aspect of the present invention, the sections within a single tab may be resizable. More particularly, some of the tabs (pages) in the group policy management console display area 504 are divided into one or more sections, in which each section groups related sets of data. For example, the group policy scope tab shown in FIG. 16 contains three sections, a section 1620 related to links, another section 1622 related to security filtering and another section 6124 related to WMI filtering. These sections are resizable (to an extent), which allows the administrator to customize the presentation of the information, depending of the relative importance and quantity of the data in a given section to that administrator. For example, if an administrator has made significant use of security filtering, that administrator can expand the security filtering section 1622 to dedicate more of the displayed area 504 to the information in this section, and in turn shrink the links section 1620. Note that in one implementation, a section such as the WMI filters section 1624 may be fixed, that is, not re-sizable, (or possibly resizable within a tighter limit), because unlike sections with items that can be added, in a described implementation, the WMI filter section contains a fixed set of data and will not grow.

To this end, as represented in FIG. 4 by resize logic 470, each of the controls that make up the displayed representation can communicate with one another, including when the user moves a mouse over a resizer bar, clicks, and drags/releases the bar. These mouse events can be interpreted relative to the overall size of the displayed page and any limits. In general, subtracting any fixed size section or sections size (or sizes) from the overall height leaves a remaining size, and movement of the resizer bar (start minus finish) determines the ratio of each sizeable section to another sizeable section.

Note that resizing the entire window (e.g., the display 500) results in messages being passed to the controls. The section ratios are preserved relative to the overall window. However the controls know their actual size (e.g., in pixels), and can then rearrange their display in a manner that adjusts for the area that each control has to display its content in.

As can be seen from the foregoing detailed description, there is provided a method and system for representing group policy object topology and relationships, such as in a treeview, as well as facilitating management of those objects in a tabbed view within a result pane area. Resizing within the tabbed view is provides, as is reselect logic. The method and system thus provide significant advantages and benefits needed in contemporary computing.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method comprising:
providing a user interface;
determining whether there is a forest bidirectional trust between a user forest and a selected forest;
if it is determined that there is a forest bidirectional trust between the user forest and the selected forest, presenting, in response to the determination that there is forest bidirectional trust between the user forest and the selected forest, the representation of the selected forest and representations of selected domains associated with the selected forest in the user interface;
if it is determined that there is not a forest bidirectional trust between the user forest and the selected forest, determining, in response to the determination that there is not forest bidirectional trust between the user forest and the selected forest, whether there is an external bidirectional trust between a user domain associated with the user forest and a selected domain associated with the selected forest;

if it is determined that there is an external bidirectional trust between a user domain associated with the user forest and a selected domain associated with the selected forest domain, presenting, in response to the determination that there is external bidirectional trust between the user domain associated with the user forest and the selected domain associated with the selected forest domain, the representation of the selected forest and representations of the selected domains associated with the selected forest in the user interface, and presenting a representation of at least one object associated with the selected forest; and detecting interaction with the user interface, and in response, performing an operation to a selected object associated with the selected forest.

2. The method of claim 1 wherein presenting the representation of the one or more forests comprises presenting each of the representations of the forests in a hierarchical view.

3. The method of claim 2 wherein presenting the representation of the selected object associated with the selected forest comprises presenting a representation of a domain object hierarchically under the representation of the selected forest.

4. The method of claim 3 further comprising presenting a representation of a group policy object hierarchically under the representation of the domain object.

5. The method of claim 2 wherein presenting the representation of the selected object associated with the selected forest comprises presenting a representation of a site object hierarchically under the representation of the selected forest.

6. The method of claim 2 wherein presenting the representation of the selected object associated with the selected forest comprises presenting a representation of a scope of management object hierarchically under the representation of the selected forest.

7. The method of claim 2 wherein presenting the representation of the selected object associated with the selected forest comprises presenting a representation of a link to a group policy object hierarchically under the representation of the selected forest.

8. The method of claim 2 wherein presenting the representation of the selected object associated with the selected forest comprises presenting a representation of a management instrument filter hierarchically under the representation of the selected forest.

9. The method of claim 2 wherein presenting the representation of the selected object associated with the selected forest comprises presenting a representation of a group policy modeling node hierarchically under the representation of the selected forest.

10. The method of claim 2 wherein presenting the representation of the selected object associated with the selected forest comprises presenting a representation of a group policy results item hierarchically under the representation of the selected forest.

11. The method of claim 2 further comprising, adding a target forest including adding a representation of the target forest to the hierarchical view.

12. The method of claim 11 wherein adding the target forest comprises receiving domain data that identifies a domain, and determining the target forest based on the domain data.

13. The method of claim 12 wherein determining the target forest based on the domain data comprises calling a directory service to obtain an identifier of the target forest based on the data that identifies the domain.

14. The method of claim 1 further comprising, receiving a request to add a target forest, determining a trust relationship between the target forest and a user domain, and adding the target forest in response to the request if two-way trust is determined to exist.

15. A computer-implemented method for presenting group policy hierarchy, the method comprising:
providing a user interface that presents representations of one or more forests having a two-way trust relationship with a user forest;
receiving a request to present in the user interface a representation of a target forest;
determining whether there is a forest bidirectional trust between the user forest and the target forest;
if it is determined that there is a forest bidirectional trust between the user forest and the target forest, presenting, in response to the determination that there is forest bidirectional trust between the user forest and the target forest, the representation of the target forest and representations of the target domains associated with the target forest in the user interface;
if it is determined that there is not a forest bidirectional trust between the user forest and the target forest, determining, in response to the determination that there is not forest bidirectional trust between the user forest and the target forest, whether there is an external bidirectional trust between a user domain associated with the user forest and a target domain associated with the target forest; and
if it is determined that there is an external bidirectional trust between a user domain associated with the user forest and a target domain associated with the target forest domain, presenting, in response to the determination that there is external bidirectional trust between the user domain associated with the user forest and the target domain associated with the target forest domain, the representation of the target forest and representations of the target domains associated with the target forest in the user interface.

16. The method of claim 15, wherein receiving the request comprises receiving a target domain name of the target domain, and determining the target forest by using the target domain name.

17. The method of claim 15, further comprising receiving a trust disable input which indicates that trust checking is not necessary.

18. The method of claim 15, wherein presenting the representation of the target forest comprises presenting a representation of the target domains associated with the target forest such that the target domains are presented hierarchically under the representation of the target forest.

19. The method of claim 15, wherein presenting the representation of the target forest comprises presenting a representation of a group policy modeling node associated with the target forest such that the group policy modeling node is presented hierarchically under the representation of the target forest.

20. The method of claim 1, wherein presenting the representation of the selected forest includes displaying a representation of a first domain of the selected forest, displaying one or more links to one or more group policy objects and displaying one or more other group policy objects, wherein the one or more links are displayed on a different hierarchical level from the one or more other group policy objects.

21. The method of claim 1, wherein presenting the representation of the selected forest includes displaying in a first display region a representation of a first domain of the selected forest, the representation of the first domain being hierarchically displayed below the representation of the first forest, displaying a representation of a first policy or a link to the first policy of the first domain, the representation of the first policy or the link to the first policy being hierarchically displayed below the representation of the first domain, and displaying in a second display region, upon selection of the representation of the first policy or link to the first policy by a user, a plurality of domains associated with the first policy, the plurality of domains including the first domain.

* * * * *